United States Patent
Hand et al.

(10) Patent No.: US 11,187,282 B2
(45) Date of Patent: Nov. 30, 2021

(54) HIGH-SPEED, OVERRUNNING COUPLING AND CONTROL ASSEMBLY, COUPLING ASSEMBLY AND LOCKING MEMBER WHICH PIVOTALLY MOVES WITH SUBSTANTIALLY REDUCED FRICTION

(71) Applicant: Means Industries, Inc., Saginaw, MI (US)

(72) Inventors: Joshua D. Hand, Midland, MI (US); Brice A. Pawley, Midland, MI (US); Riley C. Moore, Flint, MI (US); Ryan W. Essenmacher, Saginaw, MI (US); Earl A. Getchel, Midland, MI (US); Steven M. Thomas, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 16/518,371

(22) Filed: Jul. 22, 2019

(65) Prior Publication Data

US 2020/0124115 A1   Apr. 23, 2020

Related U.S. Application Data

(60) Provisional application No. 62/749,165, filed on Oct. 23, 2018.

(51) Int. Cl.
*F16D 41/12*   (2006.01)
*F16D 41/14*   (2006.01)
*F16D 41/16*   (2006.01)

(52) U.S. Cl.
CPC .......... *F16D 41/125* (2013.01); *F16D 41/14* (2013.01); *F16D 41/16* (2013.01)

(58) Field of Classification Search
CPC ........ F16D 41/125; F16D 41/14; F16D 41/16; F16D 41/12
See application file for complete search history.

(56) References Cited

U.S. PATENT DOCUMENTS 4,050,560 A   9/1977   Torstenfelt
5,070,978 A   12/1991  Pires
(Continued)

FOREIGN PATENT DOCUMENTS

GB   1473776 A   5/1977

OTHER PUBLICATIONS

The International Bureau of WIPO, International Preliminary Report on Patentability for corresponding International Application PCTUS2019/057526, dated Apr. 27, 2021.
(Continued)

*Primary Examiner* — Timothy Hannon
(74) *Attorney, Agent, or Firm* — Brooks Kushman P.C.

(57) ABSTRACT

A high-speed overrunning coupling and control assembly, coupling assembly and locking member which pivotally moves with substantially reduced friction are provided. At least one pivot projects from a main body portion of the locking member and enables pivotal motion of the locking member. The at least one pivot is sized, shaped and located with respect to the main body portion so that the at least one pivot makes contact with at least one bearing located between a pocket surface of a pocket and an outer surface of the at least one pivot to reduce friction during pivotal motion.

18 Claims, 16 Drawing Sheets

(56) References Cited

U.S. PATENT DOCUMENTS

| | | | |
|---|---|---|---|
| 5,160,005 A * | 11/1992 | Burch | F02C 7/277 |
| | | | 192/104 C |
| 5,362,293 A | 11/1994 | Romanauskas | |
| 5,449,057 A | 9/1995 | Frank | |
| 5,597,057 A | 1/1997 | Ruth et al. | |
| 5,638,929 A | 6/1997 | Park | |
| 5,678,668 A | 10/1997 | Sink | |
| 5,918,715 A | 7/1999 | Ruth et al. | |
| 5,927,455 A | 7/1999 | Baker et al. | |
| 5,964,331 A | 10/1999 | Reed et al. | |
| 6,062,362 A * | 5/2000 | Costin | F16D 41/12 |
| | | | 192/46 |
| 6,116,394 A | 9/2000 | Ruth | |
| 6,186,299 B1 | 2/2001 | Ruth | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,503,167 B1 | 1/2003 | Sturm | |
| 6,571,926 B2 | 6/2003 | Pawley | |
| 6,814,201 B2 | 11/2004 | Thomas | |
| 6,953,409 B2 | 10/2005 | Schmidt et al. | |
| 7,093,512 B2 | 8/2006 | Ibamoto et al. | |
| 7,100,756 B2 | 9/2006 | Kimes et al. | |
| 7,198,587 B2 | 4/2007 | Samie et al. | |
| 7,223,198 B2 | 5/2007 | Kimes et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,349,010 B2 | 3/2008 | Bryant et al. | |
| 7,360,634 B2 * | 4/2008 | Gadelius | F16D 41/00 |
| | | | 188/82.1 |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,743,678 B2 | 6/2010 | Wittkopp et al. | |
| 7,824,292 B2 | 11/2010 | Samie et al. | |
| 7,942,781 B2 | 5/2011 | Kimes | |
| 7,992,695 B2 | 8/2011 | Wittkopp et al. | |
| 8,011,464 B2 | 9/2011 | Samie et al. | |
| 8,042,669 B2 | 10/2011 | Samie et al. | |
| 8,042,670 B2 | 10/2011 | Bartos et al. | |
| 8,051,959 B2 | 11/2011 | Eisengruber | |
| 8,056,690 B2 | 11/2011 | Samie et al. | |
| 8,061,496 B2 | 11/2011 | Samie et al. | |
| 8,079,453 B2 | 12/2011 | Kimes | |
| 8,083,042 B2 | 12/2011 | Samie et al. | |
| 8,087,502 B2 | 1/2012 | Samie et al. | |
| 9,121,454 B2 | 9/2015 | Pawley | |
| 9,188,170 B2 | 11/2015 | Prout et al. | |
| 2006/0185957 A1 | 8/2006 | Kimes et al. | |
| 2007/0163855 A1 | 7/2007 | Gadelius et al. | |
| 2008/0110715 A1 | 5/2008 | Pawley | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0098970 A1 | 4/2009 | Kimes | |
| 2009/0194381 A1 | 8/2009 | Samie et al. | |
| 2009/0266667 A1 | 10/2009 | Samie et al. | |
| 2010/0063693 A1 | 3/2010 | Lee et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2011/0183806 A1 | 7/2011 | Wittkopp et al. | |
| 2011/0214962 A1 | 9/2011 | Shaw et al. | |
| 2011/0233026 A1 | 9/2011 | Pawley | |
| 2011/0297500 A1 | 12/2011 | Shaw et al. | |
| 2012/0145505 A1 | 6/2012 | Kimes | |
| 2014/0102848 A1 * | 4/2014 | Pawley | F16D 41/125 |
| | | | 192/71 |
| 2015/0014116 A1 | 1/2015 | Kimes et al. | |
| 2016/0377126 A1 | 12/2016 | Essenmacher | |
| 2018/0010651 A1 | 1/2018 | Kimes | |
| 2018/0038425 A1 | 2/2018 | Kimes | |

OTHER PUBLICATIONS

International Searching Authority, Search Report and Written Opinion for International Application No. PCT/US2019/57526, dated Jan. 17, 2020.

* cited by examiner

HIGH-SPEED, OVERRUNNING COUPLING AND CONTROL ASSEMBLY, COUPLING ASSEMBLY AND LOCKING MEMBER WHICH PIVOTALLY MOVES WITH SUBSTANTIALLY REDUCED FRICTION

CROSS-REFERENCE TO RELATED APPLICATIONS

This application claims the benefit of U.S. provisional application Ser. No. 62/749,165, filed Oct. 23, 2018, the disclosure of which is hereby incorporated in its entirety by reference herein.

TECHNICAL FIELD

This invention generally relates to high-speed, overrunning coupling and control assemblies, coupling assemblies and locking members which pivotally move with substantially reduced friction.

OVERVIEW

As described in U.S. Pat. No. 6,571,926 entitled "One-Way Clutch Assembly Featuring Improved Strut Stability" and assigned to the assignee of the present application, clutches are used in a wide variety of applications to selectively couple power from a first rotatable "driving" member, such as a driving disk or plate, to a second, independently-rotatable "driven" member, such as a driven plate or disk. In one known variety of clutches, commonly referred to as "one-way" or "overrunning" clutches, the clutch "engages" to mechanically couple the driving member to the driven member only when the driving member seeks to rotate in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One such known one-way clutch employs juxtaposed, nominally-coaxial driving and driven members featuring generally planar clutch faces in closely-spaced axial opposition. Such "planar" one-way clutches, as taught by Frank in U.S. Pat. No. 5,449,057 and Ruth et al. in U.S. Pat. No. 5,597,057, typically include a plurality of recesses formed in the face of the driving member and at least as many recesses formed in the face of the driven member. A thin, flat strut is carried within each of the driving member's pockets such that a first longitudinal end of each strut may readily engage and bear against a shoulder defined by its respective recess of the driving member. The strut's second, opposite longitudinal end is urged toward and against the face of the driven member, for example, by a spring positioned beneath the strut in the recess of the driving member.

When the driving member rotates in the first direction relative to the driven member, the second end of at least one strut engages and thereafter bears against a shoulder defined by a recess of the driven member, whereupon the strut is placed in compression and the driven member is coupled for rotation with the driving member. When the driving member rotates in the second direction relative to the driven member, ramped surfaces defined by other portions of the driven member's recesses urge the second end of each strut back towards the driving member, whereupon the driving member is permitted to freely rotate in the second direction relative to the driven member.

The draft angle of the outer pocket wall can significantly affect the strut laydown speed. Angles above zero degrees tend to increase the laydown speed, while negative angles can be used to decrease the laydown speed. However, this presents the trade-off of manufacturing complexity, higher draft angles generally represent lower manufacturing costs as they can increase the life of the press used to produce the pocket plate. Whereas zero or negative draft angles are more difficult to produce, and usually require a secondary machining operation.

U.S. published application No. 2011/0297500 (also assigned to the assignee of the present application) provides a dynamic engagement analysis of a strut within its respective pocket wherein various forces acting upon the strut are illustrated and described as follows:

$F_R$=Resultant Strut Force. The force available to push the strut out of its pocket (i.e. resultant force on the strut).

$F_S$=Spring Force. The force created by a spring used to push the strut out of its pocket for engagement with the notch plate.

$F_C$=Centrifugal Force. The effective weight of the strut due to rotation of the pocket plate during operation. (Force of strut against pocket plate wall). This is a fictitious force dependent on the frame of reference of the observer.

$F_F$=Friction Force. This force is created by the effective weight of the strut (centrifugal force) acting on the pocket plate. The higher the rotational speed the larger the friction force. This force prevents the strut from pushing out of its pocket.

$F_P$=Strut Pushout Force. The angle of the pocket plate wall causes the strut to push out of the pocket plate. This is due to the centrifugal forces created by the rotation of the pocket plate.

$F_L$=Fluid Force. This force is created by the effect of the strut displacing transmission fluid when engaging into the notch plate.

As described in the above-noted application, a "truly vertical" or "slightly negative" vertical wall improves the stability of a strut or rocker (i.e. collectively referred to as "locking members") which experiences rotational centrifugal forces during overrun. Also, the "slightly negative" angle lowers the rpm even further at which a strut "locks down" due to such centrifugal forces.

In other words, performance is improved when a pocket plate wall is machined vertical or slightly negative versus a cast, positively angled, surface which may have a draft such as 1-2 degrees or 0.5-1 degrees (i.e. the surface is angled "slightly positive").

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. Nos. 7,258,214 and 7,484,605 disclose an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. Patent Publications include: 2015/0014116; 2016/0377126; 2011/0183806; 2011/0233026; 2011/0214962; 2010/0252384; 2010/0230226; 2010/0063693; 2010/0200358; 2009/0098970; 2009/0194381; 2008/0223681; 2008/0110715; 2008/0169166; 2008/0185253; 2006/0185957; and the following U.S. Pat. Nos.

7,942,781; 8,079,453; 7,967,121; 7,992,695; 8,051,959; 8,011,464; 8,042,669; 8,061,496; 8,042,670; 8,056,690; 8,083,042; 8,087,502; 7,824,292; 7,743,678; 7,491,151; 7,464,801; 7,448,481; 7,455,156; 7,661,518; 7,349,010; 7,275,628; 7,256,510; 7,223,198; 7,198,587; 7,100,756; 7,093,512; 6,953,409; 6,896,111; 6,814,201; 6,503,167; 6,193,038; 6,116,394; 6,186,299; 6,571,926; 4,050,560; 5,638,929; 5,362,293; 5,678,668; 5,918,715; 5,070,978; 5,964,331; and 9,188,170.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A "moment of force" (often just moment) is the tendency of a force to twist or rotate an object. A moment is valued mathematically as the product of the force and a moment arm. The moment arm is the perpendicular distance from the point or axis of rotation to the line of action of the force. The moment may be thought of as a measure of the tendency of the force to cause rotation about an imaginary axis through a point.

In other words, a "moment of force" is the turning effect of a force about a given point or axis measured by the product of the force and the perpendicular distance of the point from the line of action of the force. Generally, clockwise moments are called "positive" and counterclockwise moments are called "negative" moments. If an object is balanced then the sum of the clockwise moments about a pivot is equal to the sum of the counterclockwise moments about the same pivot or axis.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

FIG. 1 is a top plan view of a prior art locking member or strut, generally indicated at 10, received and nominally retained within a pocket 12 of a coupling face 14 of a coupling member, generally indicated at 16, such as a pocket plate. At high rotational speeds, such as 2000 RPM and above, the strut 10 locks itself against outer walls 18 of the pocket 12 due to centrifugal frictional affects as reactive forces, $F_{R1}$ and $F_{R2}$ which are spaced a relatively large distance from an engagement rotational axis 20 of the strut 10. Consequently, the overall movement that has to be overcome to engage and disengage the strut 10 with respect to a second coupling member (not shown in FIG. 1, but shown in many of the other Figures) such as a notch plate is quite large.

FIG. 2 illustrates a locking member or strut, generally indicated at 22, which transmits torque between first and second clutch or coupling members. As described in U.S. Pat. No. 9,121,454, the first coupling member 24 may be a pocket plate which can rotate in either a clockwise direction or a counter-clock-wise direction (as indicated at 29) about the rotational axis (not shown) of the assembly and includes a generally flat, annular coupling face 30 having a plurality of pockets, generally indicated at 32, each one of which is sized and shaped to receive and nominally retain a locking member such as the locking member 22. The pockets 32 are spaced about the axis of the assembly 28. The face is oriented to face axially in a first direction along the rotational axis of the assembly.

The second clutch member (not shown) may be a notch plate and has a generally flat, annular coupling second face opposed to the first face 30 and oriented to face axially in a second direction opposite the first direction along the rotational axis of the assembly. The second face has a plurality of locking formations that are engaged by the locking members 22 upon projection from the pockets 32 to prevent relative rotation of the first and second members with respect to each other in at least one direction about the axis of the assembly.

The locking member 22 includes a member-engaging first end surface 34, a member-engaging second end surface 36, and an elongated main body portion 38 between the end surfaces 34 and 36. The locking member 22 also includes projecting inner and outer pivots 40 and 42, respectively which extend laterally from the main body portion 38 for enabling pivotal motion of the locking member 22 about a pivot axis 44 of the locking member 22 which intersects the pivots 40 and 42. The end surfaces 34 and 36 of the locking member 22 are movable between engaged and disengaged positions with respect to the coupling members during the pivotal motion whereby one-way torque transfer may occur between the coupling members in the engaged positions of the locking members 22.

In general, the pivots 40 and 42 are sized, shaped and located with respect to the main body portion 38 to allow frictional engagement of an end surface 45 of the outer pivot 42 with an outer wall 46 of the pocket 32 to occur near the pivot axis 44 during rotation of the first coupling member 24 and the retained locking member 22 above a predetermined RPM, thereby significantly reducing overall moment on the locking member 22 about the pivot axis 44 that has to be overcome to move the locking member 22 between its engaged and disengaged positions.

The assembly also includes an aperture retainer element or plate supported between the first and second clutch members respectively. The retainer element has at least one element completely therethrough to allow the locking members or struts 22 to extend therethrough and lock the first and second clutch members together. The upper surfaces of the pivots 40 and 42 pivot against the lower surface of the retainer plate during such movement.

The overall or net moment on the locking member 22 is negative during pivotal moment of the locking member 22 from the disengaged position to the engaged position.

The overall or net moment on the locking member 22 is positive during pivotal motion of the locking member 22 from the engaged position to the disengaged position.

The inner pivot 40 is notched as indicated at 48, to allow frictional engagement of a side surface of the notched inner pivot 40 with an inner wall 52 of the pocket 32 and to prevent rotation of the locking member 22 in the pocket 32. The outer pivot 42 may also be notched in like fashion so that the locking member 22 can be used as either a forward locking member or a reverse locking member.

Center of gravity (i.e., C.G.) of the locking member 22 is located within the main body portion 38 and spaced away from the pivot axis 44.

Friction is the force that opposes the relative motion or tendency of such motion of two surfaces in contact. The coefficient of friction (also known as the frictional coefficient) is a dimensionless scalar value which describes the ratio of the force of friction between two bodies and the force pressing them together.

As discussed in U.S. Published Patent Applications 2018/0010651 and 2018/0038425, as eCMDs (i.e. electrically controllable mechanical diodes) become more accepted as a feasible technology for Advanced Hybrids and EVs, the specification and requirements for the clutches is rapidly increasing. The nature of E-motors is high torque at zero/low speed with the capability of spinning 3 times faster than a tradition ICE application. eCMDs need to be able to turn ON and OFF at speeds of at least 15,000 RPM. The formula for the radial force generated by rotation is . . .

$$F_c = MV^2/r$$

So the radial force is increased at the square of velocity. So an example from a design of the strut in a clutch that weighs 4.17 grams at a speed of 15,000 RPM translates into a radial force of the strut in its pocket of 151 lbs. These are the new realities that eCMD designers are now faced with. The control system (electro-mechanical portion) of the eCMD must be able to rotate the strut in the presence of these huge radial forces. These radial forces are not reacted by the outer wall of the pocket plate. A frictional force is generated that creates an opposing moment to the desired rotation of the strut. The frictional force equation (formula) is . . .

$$F_f = \mu N \text{ where } N = F_c \text{ and } \mu = \text{coefficient of friction}$$

The opposing moment equation is . . .

$$M = F_f r$$

Where the r=the moment arm which is the distance from the pivot point to the point of contact of the strut to the pocket.

The lower the value of M, the easier it is for the electro-mechanical portion of the eCMD to rotate the strut. So for a given speed of the clutch the parameters that can be manipulated to reduce the moment are Mass of the strut, the value of $\mu$ and the length of the moment arm. An objective of the disclosures of 2018/0010651 and 2018/0038425 is to reduce the moment arm.

"Strut instability" is an unfavorable state often characterized by a strut that is extended when it should be seated in its pocket. Strut instability is a primary concern in terms of durability as it directly correlates to premature spring, strut and pocket wear and eventual failure. It is advantageous during the overrun phase that the struts descend into their respective pockets to minimize parasitic loses due to various Newtonian interactions. The minimum angular velocity of the pocket plate which keeps the strut confined to the pocket is often referred to as the strut "laydown" speed.

The mechanics effecting the descent of the strut are numerous and can be correlated to (among many other factors) rotational velocity of the pocket plate, angular acceleration of the pocket plate, strut geometry, spring coefficient, fluid interactions and pocket wall draft angle as previously mentioned.

U.S. Published Application No. 2017/0343060 discloses a coupling member for an engageable coupling assembly including a coupling face having at least one pocket. Each pocket is sized and shaped to receive and nominally retain a locking member that lays down in its pocket during an overrunning condition of the assembly at a laydown angular velocity of the coupling member about a rotational axis of the assembly. Each pocket has a pocket axis which is angled with respect to a normal to a centerline of the coupling member to improve locking member dynamics with regards to strut laydown speed during the overrunning condition.

SUMMARY OF EXAMPLE EMBODIMENTS

An object of at least one embodiment of the present invention to provide a high-speed coupling and control assembly, coupling assembly and locking member for use therein wherein friction between the locking member and a side surface of its pocket is substantially reduced to facilitate pivotal movement of the locking member.

An object of at least one embodiment of the present invention is to provide a high-speed coupling and control assembly, coupling assembly and locking member for use therein wherein friction between the locking member and an outer wall of a pocket which is normally contacted by the locking member at high rotational speeds is greatly reduced by providing a bearing between the locking member and the wall thereby reducing the coefficient of friction therebetween.

In carrying out the above objects, and other objects of at least one embodiment of the present invention, a locking member for controllably transmitting torque between first and second coupling members of a coupling assembly is provided. The first coupling member rotates about a rotational axis of the assembly and includes a centerline through the axis and a coupling face having a pocket which is at least partially defined by a pocket surface. The pocket is sized and shaped to receive and nominally retain the locking member and at least one bearing. The locking member pivots down into the pocket during an overrunning condition of the assembly. The locking member includes a member-engaging first end surface, a member-engaging second end surface, a main body portion between the end surfaces and at least one pivot which projects from the main body portion. The at least one pivot enables pivotal motion of the locking member and is sized, shaped and located with respect to the main body portion so that the at least one pivot makes contact with the at least one bearing located between the pocket surface and an outer surface of the at least one pivot to reduce friction during the pivotal motion.

The at least one pivot may be a generally cylindrical end portion for contacting the at least one bearing wherein the at least one bearing may comprise a thrust bearing which reacts centrifugal forces generated from the locking member at high speeds about the rotational axis.

The end surfaces of the locking member may be movable between engaged and disengaged positions with respect to the coupling members during the pivotal motion whereby one-way torque transfer may occur between the coupling members.

The at least one pivot may comprise at least one projecting ear which extends laterally from the main body portion wherein the at least one bearing may comprise a thrust bearing which reacts centrifugal forces generated from the locking member at high speeds about the rotational axis.

The at least one pivot may comprise inner and outer projecting ears which extend laterally from the main body portion wherein the at least one bearing may include a roller bearing on each ear.

The at least one pivot may comprise a convex upper pivot which extends upwardly from the main body portion wherein the at least one bearing may include a roller bearing on opposite sides of the upper pivot.

The locking member may be a planar or radial locking strut.

The locking strut may be an active locking strut.

The locking member may be a metal injection molded locking member.

The locking member may include inner and outer pivots which extend laterally from the main body portion for enabling pivotal motion of the locking member about an axis which intersects the pivots.

Each pocket may have inner and outer pocket walls. The inner pocket wall may be parallel to a normal to the centerline. The outer pocket wall may be angled with respect to the normal of the centerline to improve locking member dynamics.

Further in carrying out the above objects and other objects of at least one embodiment of the present invention, an engageable coupling assembly is provided. The assembly includes first and second coupling members. The first coupling member rotates about a rotational axis of the assembly and includes a centerline through the axis and a coupling face having a pocket which is at least partially defined by a pocket surface. The pocket is sized and shaped to receive and nominally retain a locking member and at least one bearing. The locking member pivots down into the pocket during an overrunning condition of the assembly. The locking member includes a member-engaging first end surface, a member-engaging second end surface, a main body portion between the end surfaces and at least one pivot which projects from the main body portion. The at least one pivot enables pivotal motion of the locking member and is sized, shaped and located with respect to the main body portion so that the at least one pivot makes contact with the at least one bearing located between the pocket surface and an outer surface of the at least one pivot to reduce friction during the pivotal motion.

The at least one pivot may comprise a convex upper pivot which extends upwardly from the main body portion wherein the at least one bearing may include a roller bearing on opposite sides of the upper pivot.

The at least one pivot may have a generally cylindrical end portion for contacting the at least one bearing wherein the at least one bearing may comprise a thrust bearing which reacts centrifugal forces generated from the locking member at high speeds about the rotational axis.

The end surfaces of the locking member may be movable between engaged and disengaged positions with respect to the coupling members during the pivotal motion whereby one-way torque transfer may occur between the coupling members.

The at least one pivot may comprise at least one projecting ear which extends laterally from the main body portion wherein the at least one bearing may comprise a thrust bearing which reacts centrifugal forces generated from the locking member at high speeds about the rotational axis.

The at least one pivot may comprise inner and outer projecting ears which extend laterally from the main body portion wherein the at least one bearing may include a roller bearing on each ear.

The locking member may be a planar or radial locking strut.

The locking strut may be an active locking strut.

The locking member may be a metal injection molded locking member.

The locking member may include inner and outer pivots which extend laterally from the main body portion for enabling pivotal motion of the locking member about an axis which intersects the pivots.

Each pocket may have inner and outer pocket walls. The inner pocket wall may be parallel to a normal to the centerline and the outer pocket wall may be angled with respect to the normal of the centerline to improve locking member dynamics.

Still further in carrying out the above objects and other objects of at least one embodiment of the present invention, an overrunning coupling and control assembly is provided. The assembly includes first and second coupling members. The first coupling member rotates about a rotational axis of the assembly and includes a centerline through the axis and a first coupling face having a pocket which is at least partially defined by a pocket surface. The pocket is sized and shaped to receive and nominally retain a locking member and at least one bearing. The first coupling member includes a second face spaced from the first coupling face and having a passage in communication with the pocket to communicate an actuating force to the locking member to actuate the locking member within the pocket so that the locking member moves between engaged and disengaged positions. The locking member pivots down into the pocket during an overrunning condition of the assembly. The locking member includes a member-engaging first end surface, a member-engaging second end surface, an elongated main body portion between the end surfaces, and at least one pivot which projects from the main body portion. The at least one pivot enables pivotal motion of the locking member and is sized, shaped and located with respect to the main body portion so that the at least one pivot makes contact with the at least one bearing located between the pocket surface and an outer surface of the at least one pivot to reduce friction during the pivotal motion.

The at least one pivot may have a generally cylindrical end portion for contacting the at least one bearing wherein the at least one bearing may comprise a thrust bearing which reacts centrifugal forces generated from the locking member at high speeds about the rotational axis.

The end surfaces of the locking member may be movable between engaged and disengaged positions with respect to the coupling members during the pivotal motion whereby one-way torque transfer may occur between the coupling members.

The at least one pivot may comprise at least one projecting ear which extends laterally from the main body portion wherein the at least one bearing may comprise a thrust bearing which reacts centrifugal forces generated from the locking member at high speeds about the rotational axis.

The at least one pivot may comprise inner and outer projecting ears which extend laterally from the main body portion wherein the at least one bearing includes a roller bearing on each ear.

The locking member may be a planar or radial locking strut.

The locking strut may be an active locking strut.

The locking member may be a metal injection molded locking member.

The at least one pivot may comprise a convex upper pivot which extends upwardly from the main body portion wherein the at least one bearing may include a roller bearing on opposite sides of the upper pivot.

The locking member may include inner and outer pivots which extend laterally from the main body portion for enabling pivotal motion of the locking member about an axis which intersects the pivots.

Each pocket may have inner and outer pocket walls. The inner pocket wall may be parallel to a normal to the centerline and the outer pocket wall may be angled with respect to the normal of the centerline to improve locking member dynamics.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
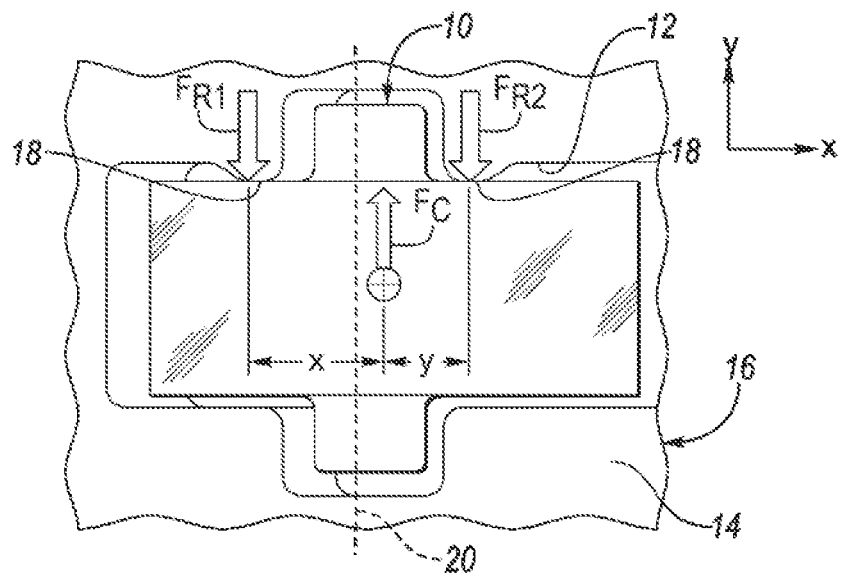
FIG. 1 is a top plan view, partially broken away, of a prior art locking member or strut located in a pocket of a rotating pocket plate together with a pivot axis of the strut, different reactive forces, $F_{R1}$ and $F_{R2}$, and a centrifugal force $F_C$ at a center of gravity of the strut.
Figure 2:
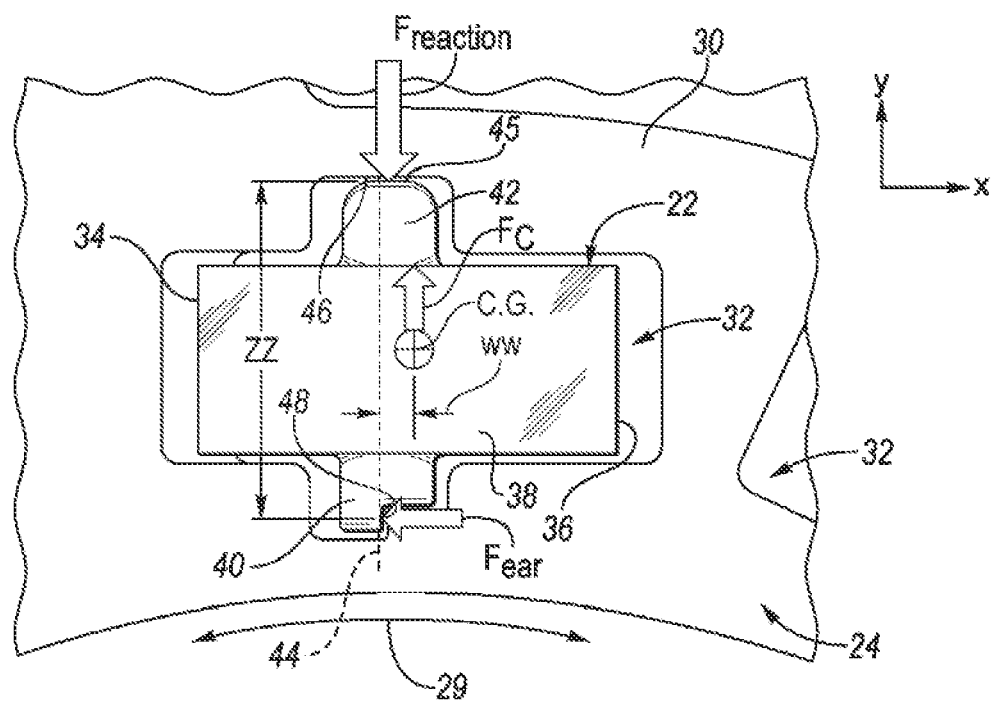
FIG. 2 is a view similar to the view of FIG. 1 of a different prior art locking member and different moment arms and forces.
Figure 3:
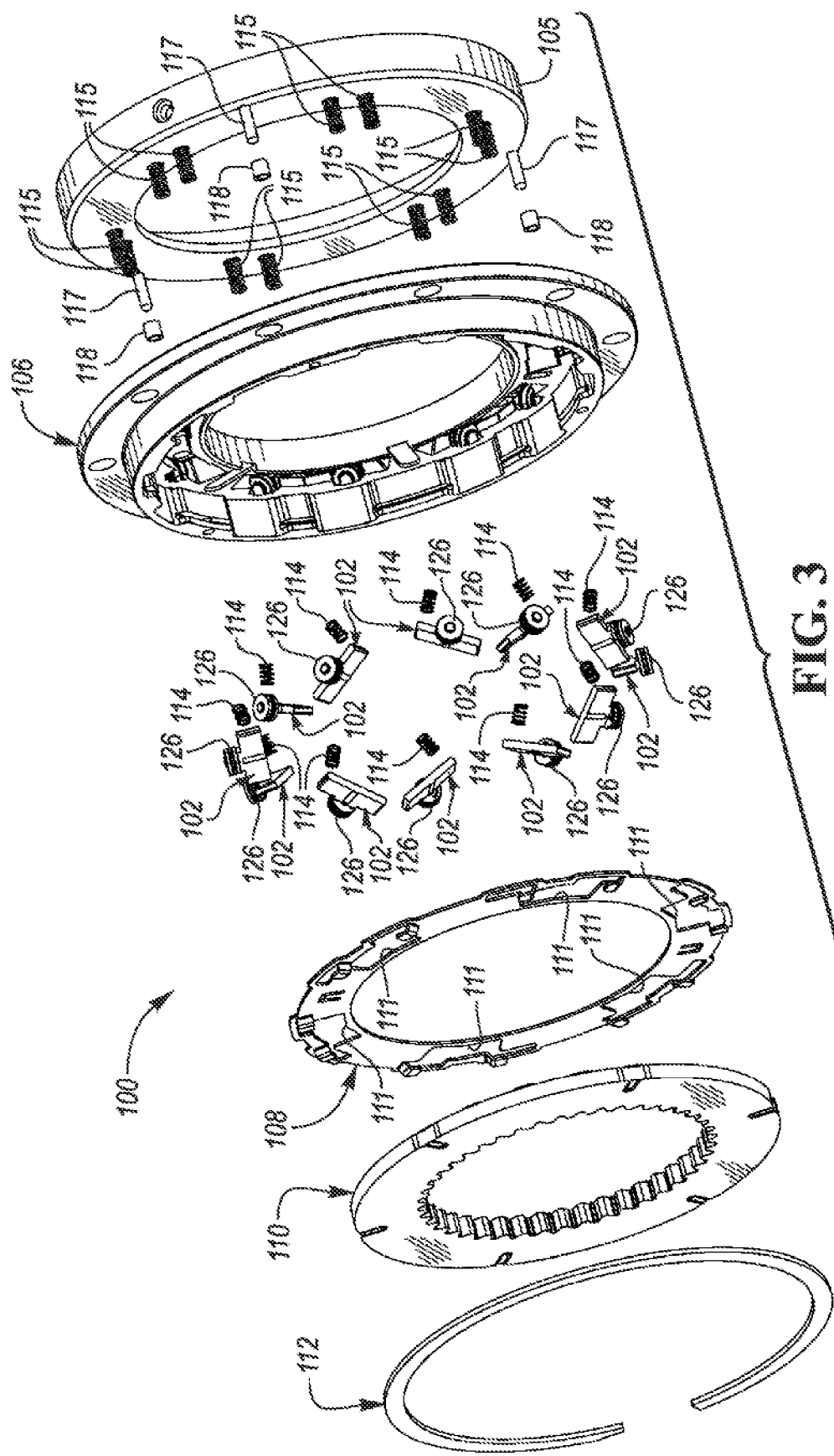
FIG. 3 is an exploded perspective view of an overrunning active coupling and control assembly constructed in accordance with at least one embodiment of the invention.
Figure 4:
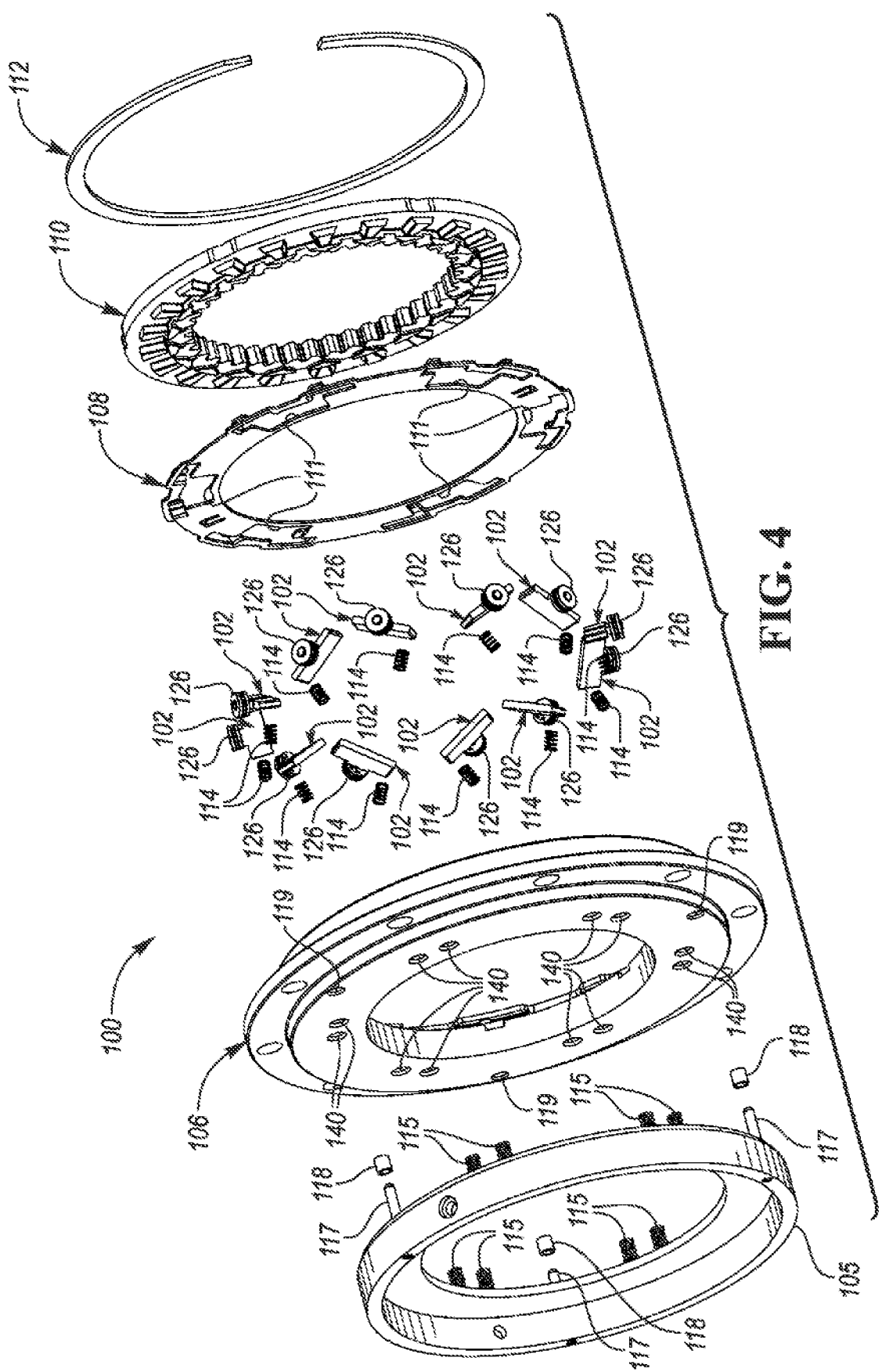
FIG. 4 is a view similar to the view of FIG. 3 but from a reverse angle.

In general, a locking member or strut, generally indicated at 102, is disclosed herein which can be used in its respective coupling and control assembly 100 (FIGS. 3 and 4). Different embodiments of the locking member 102 are specifically shown in drawing FIGS. 7-9 and 11-15.

Figure 11:
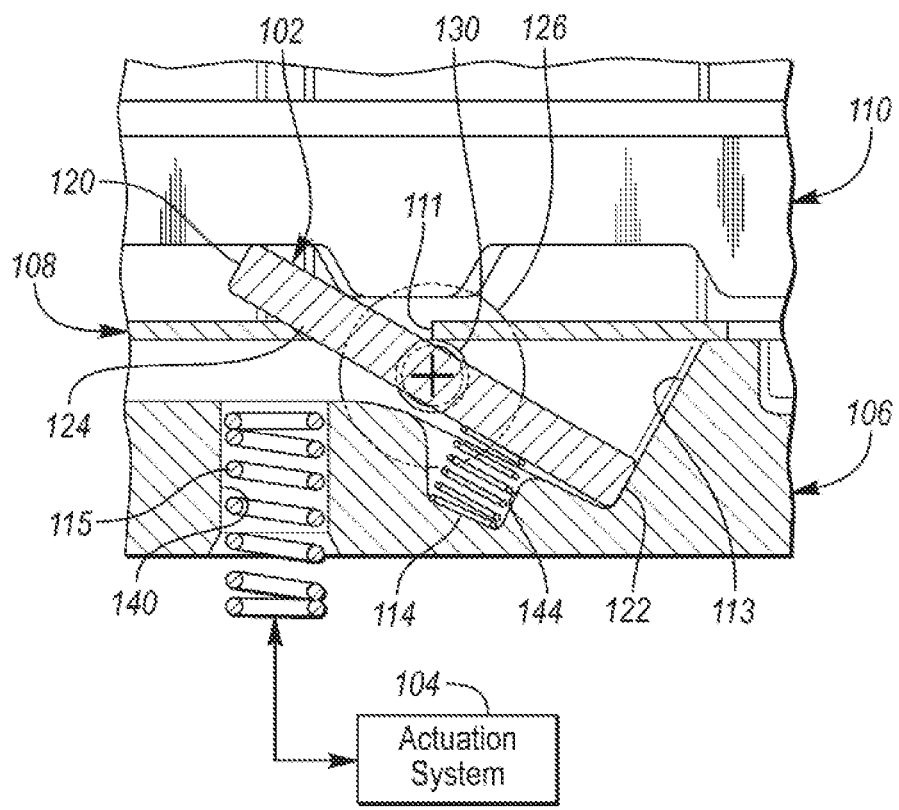
FIG. 11 is a side view, partially broken away and in cross-section, showing a bearing on an ear of the locking member and various biasing members or springs with an actuation system to control movement of the locking member.
Figure 12:
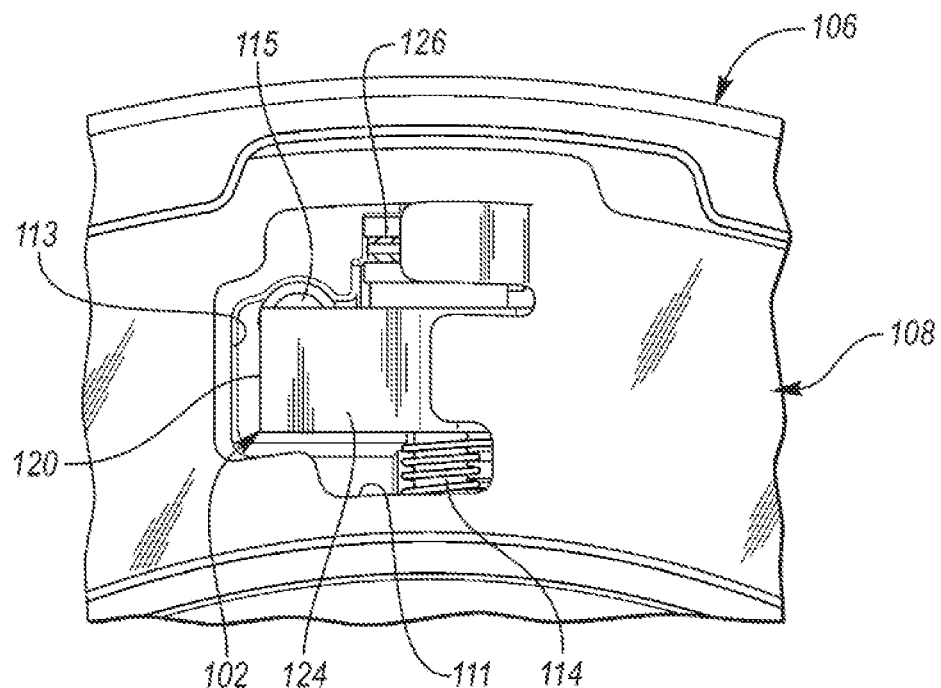
FIG. 12 is a top plan view, partially broken away, of a locking member, its bearing, and springs within a pocket of a pocket plate together with a retainer plate.
Figure 13:
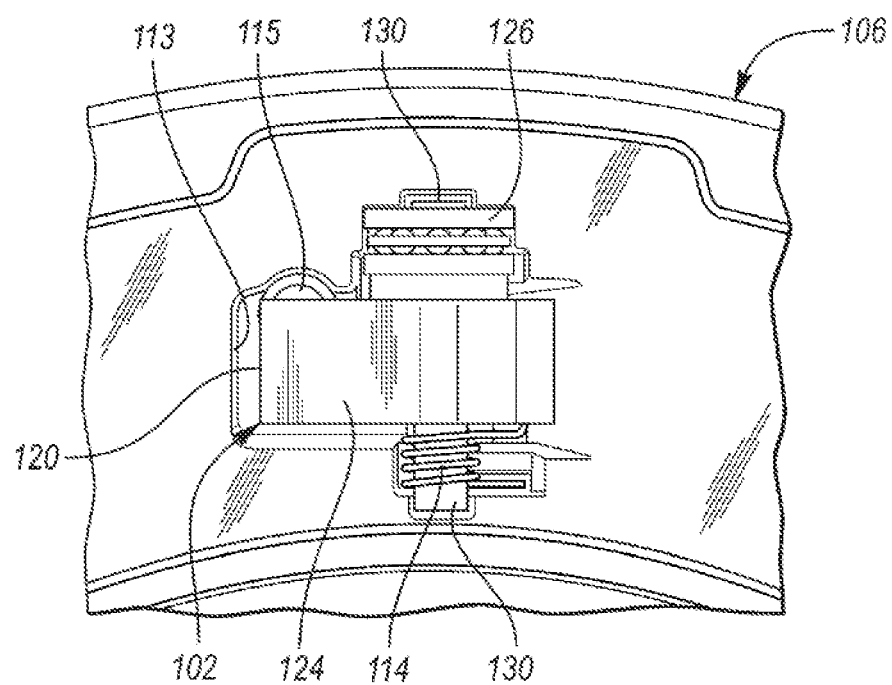
FIG. 13 is a view similar to the view of FIG. 12 but with the retainer plate removed.
Figure 14:
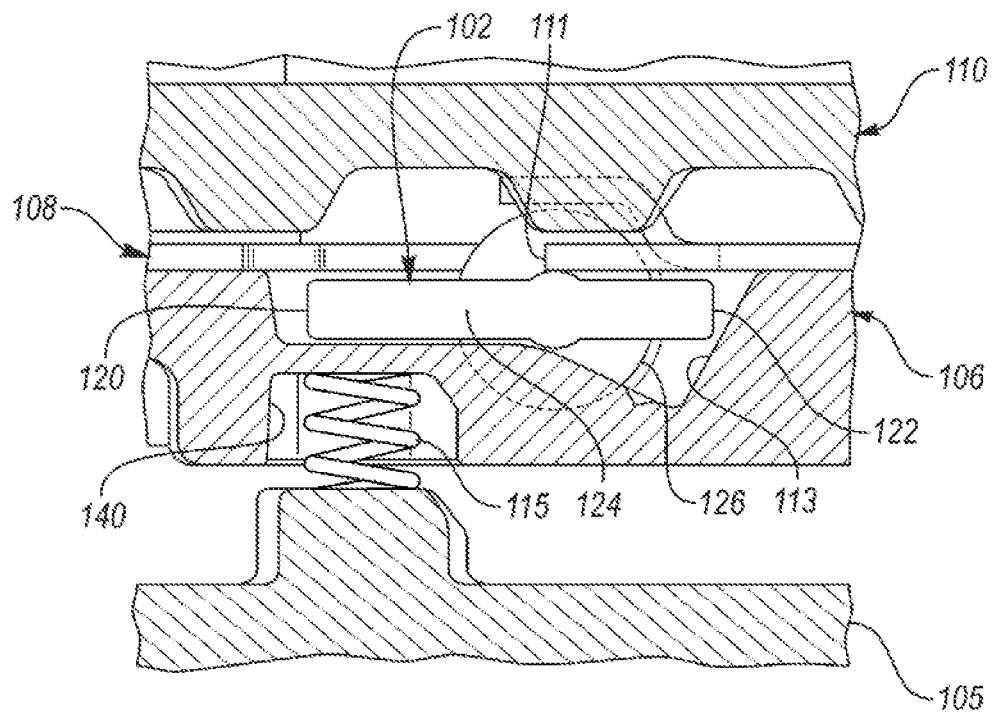
FIG. 14 is a view similar to the view of FIG. 11 but showing an apply plate as part of the actuation system and the locking member in its retracted, uncoupling position.
Figure 15:
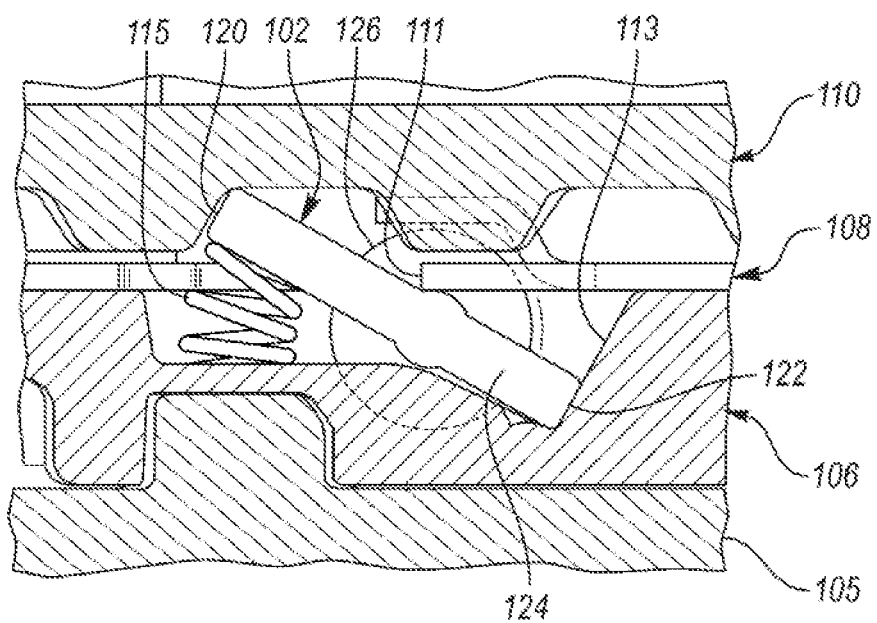
FIG. 15 is a view similar to the view of FIG. 14 but showing the locking member in its extended, coupling position.
Figure 16:
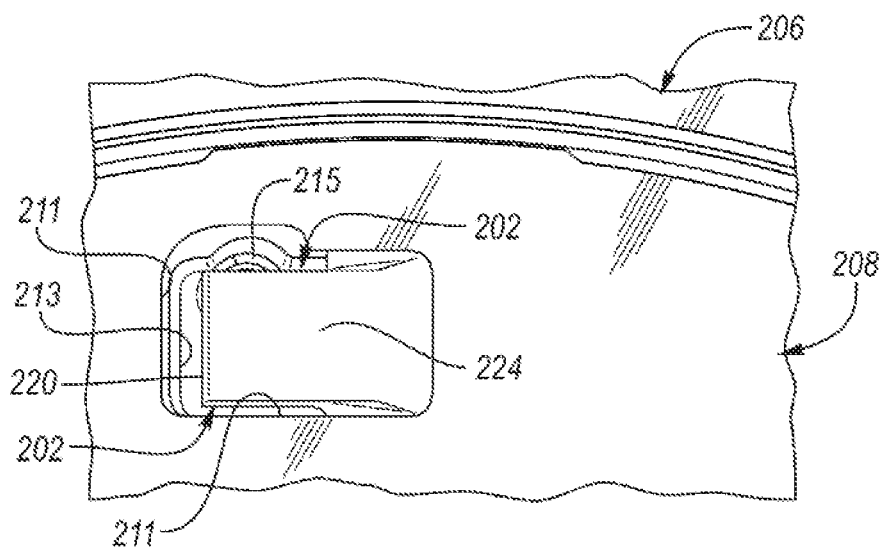
FIG. 16 is a top plan view, partially broken away, of a locking member of a different embodiment within a pocket of a pocket plate together with a retainer plane.
Figure 17:
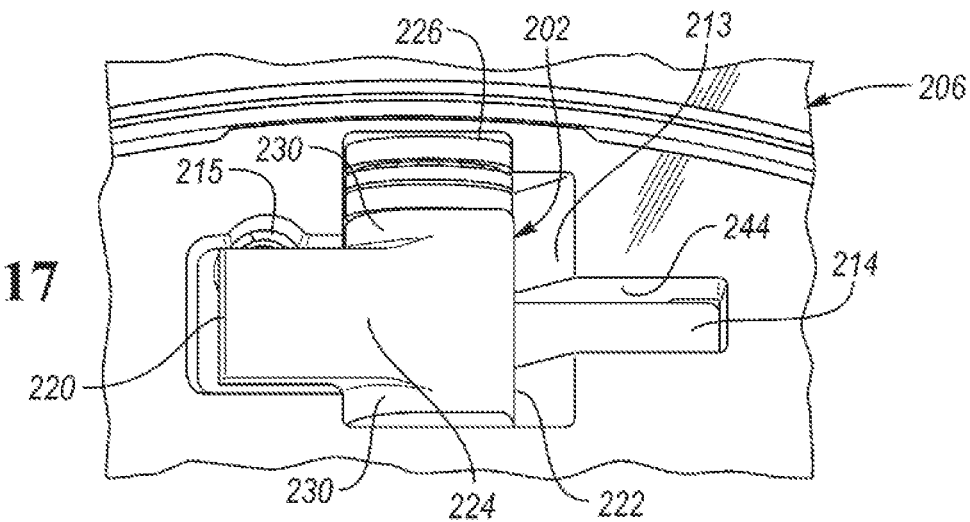
FIG. 17 is view similar to the view of FIG. 16 but with the retainer plate removed to reveal a return spring in the form of a leaf spring and a thrust bearing for the locking member.
Figure 18:
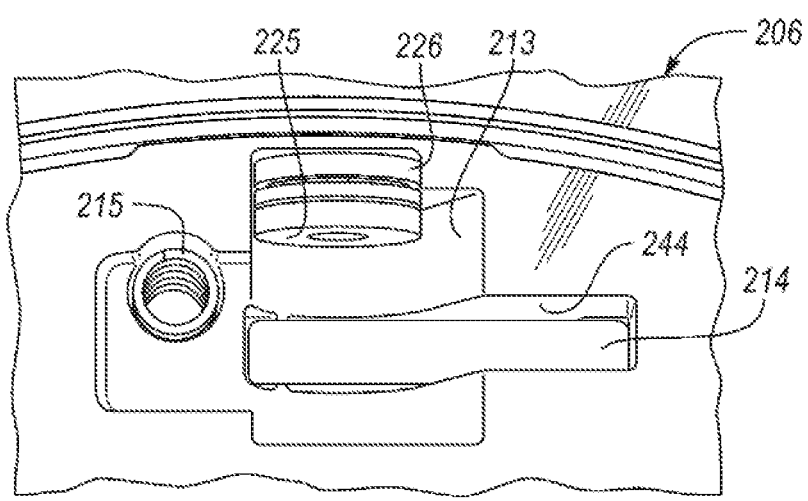
FIG. 18 is a view similar to the views of FIGS. 16 and 17 but with the locking member and the retainer plate removed to particularly show the leaf spring, the bearing and an axial apply spring for the locking member.
Figure 19:
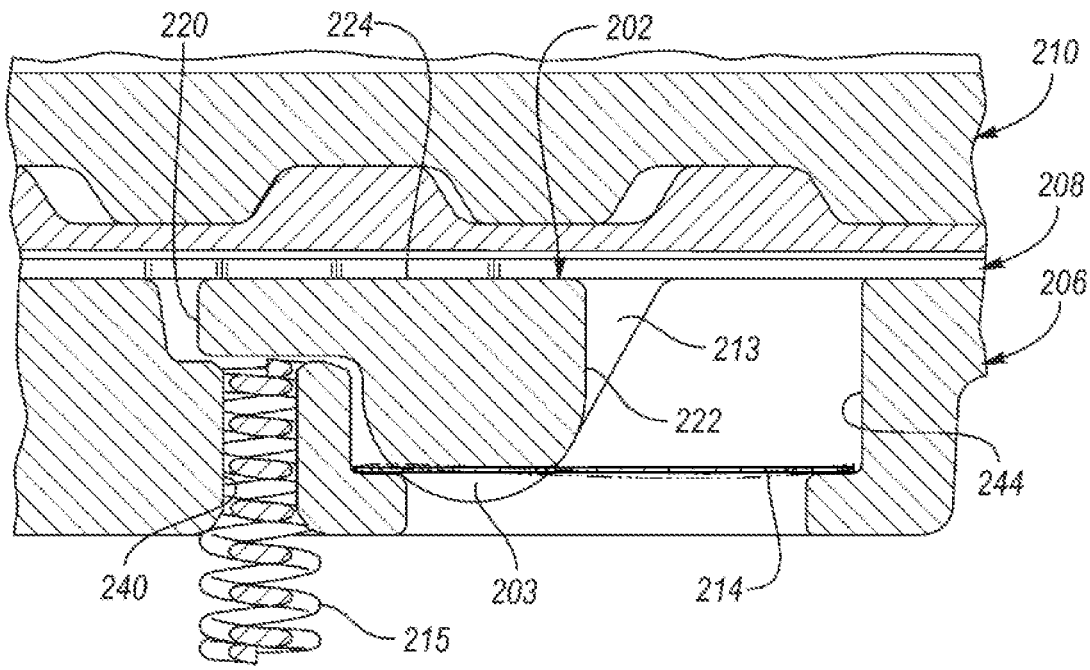
FIG. 19 is a view similar to the view of FIG. 14 and showing the locking member, the leaf spring and actuating spring of FIGS. 16-18, with the locking member in its retracted, uncoupling position.
Figure 20:
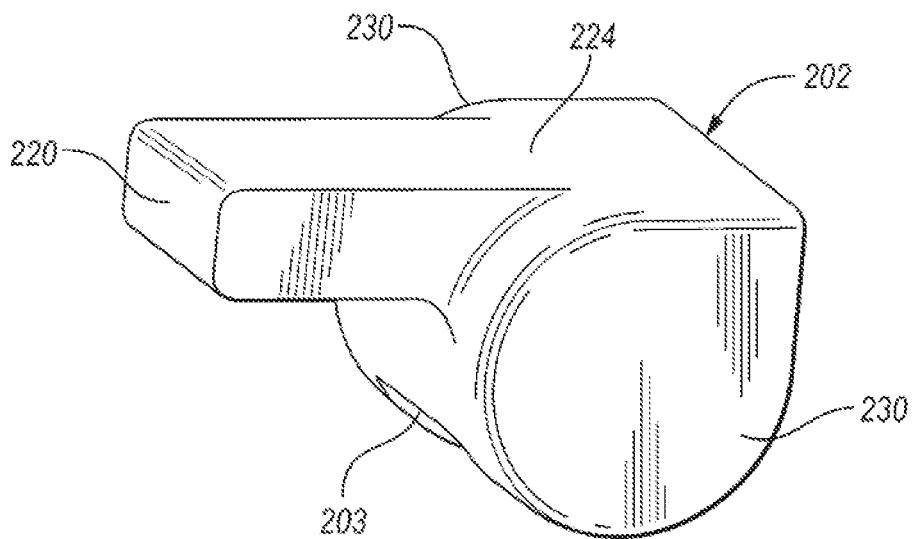
FIG. 20 is a side perspective view of the locking member or strut of FIGS. 16, 17 and 19.

The active rotating or pivoting strut 102 is actuated to move into its up or coupling position (FIGS. 11 and 15) so that a lock can occur between a pocket plate 106 and a notch plate 110. This occurs when an actuation system 104 (FIG. 11) including an apply plate, generally indicated at 105, and actuating or apply springs 115 are commanded to move the strut 102. The centrifugal force generated by the rotating strut 102 can hold the strut 102 in the notch plate 110 and prevent disengagement from occurring due to friction. To overcome this issue, a return spring 114 with more force can be used. With at least one embodiment of the invention, the strut 102 can be disengaged with a relatively small return spring. The apply springs 115 are designed to ride on the outside wall of the pockets to reduce the effects of centrifugal force. If this was not designed this way, an apply spring 115 could get caught between the strut and pocket which could cause damage to the apply spring or not allow the apply spring to push the strut in the engaged position. This could also be done with the return spring when coil springs are used as shown in FIG. 11. A torsion spring 114 is used in FIG. 13 on the strut inside ear which has little change in function with centrifugal force (this torsion spring is used in this configuration due to packing also).

In at least one embodiment of the invention, at least one bearing in the form of a thrust bearing 126 (i.e., FIGS. 3, 4, 6 and 11-15) is used for the actively controlled strut 102 with a dynamic clutch where the active strut 102 is actuated to move into its up position so that a lock can occur between the pocket plate 106 and notch plate 110. When the actuation system is commanded so the strut 102 can disengage itself, the centrifugal force generated by the rotating strut 102 can hold itself in the pocket plate 106 and prevent disengagement from occurring due to the friction. The force to actuate also becomes too large to manage. To overcome this issue, the return spring 114 and the apply spring 115 with more force can be used.

With this embodiment of the invention, the strut 102 can be disengaged with either a small return spring 114, or no return spring depending on how the strut 102 needs to behave at lower speeds, and the force to apply becomes much lower. The thrust bearing 126 is used in between the pocket plate 106 and the strut 102 so that all the force generated by the strut 102 is acted directly onto the bearing 126. This strut 102 is in the planer direction which allows the center of mass of the strut 102 does not affect the function of engaging or disengaging. The insensitivity of the center of mass of the strut 102 is due to the orientation of the planer configuration which is important since a strut in the radial direction (i.e., FIGS. 7-9) will always have the center of mass affecting the engagement and disengagement forces. The bearing 126 is used to minimize the friction that resists the strut's pivoting motion. Without the bearing, the friction interface is characterized by the coefficient of friction for lubricated steel on steel (approximately 0.2). With the bearing, the friction interface is characterized by the coefficient of rolling friction for a steel rolling ball in a steel race (approximately 0.0015). This reduces the frictional load on the strut dramatically (approximately 98.2% reduction).

The assembly 100 includes the backing or apply plate 105, the pocket plate 106, a cover or retainer plate, generally indicated at 108, the notch plate 110, and a snap ring, generally indicated at 112, which holds all of the plates 105, 106, 108 and 110 together. The biasing members or apply springs 115 bias their respective struts 102 within their respective pockets 113.

The apply plate 105 supports dowels 117 and the pocket plate 106 supports bushings 118 in holes 119 in which the dowels 117 are supported by the bushings 118. In this way, the plates 106 and 105 are connected. The retainer plate 108 has a plurality of passages 111 through which the struts 102 can extend so that the struts 102 can perform their locking function.

Each strut 102 includes a member-engaging first end surface 120, a member-engaging second end surface 122 and an elongated main body portion 124 between the end surfaces 120 and 122. At least one and preferably two (so that each strut 102 can be used as either a forward or a reverse strut) projecting ears 130 extends laterally from the main body portion 124. The end surfaces 122 and 120 of the locking member 102 are moveable between engaged and disengaged positions with respect to the pocket plate 106 and the notch plate 110 during pivotal motion whereby one-way torque transfer may occur between the pocket plate 106 and the notch plate 110.

The biggest force that exists in this design is a stabilizing force that wants to keep the strut 102 in the down position caused by high rotational speeds. This force gets bigger as speed in the clutch increases. This force does not exist in the radial style strut of FIGS. 7-9.

Figure 7:
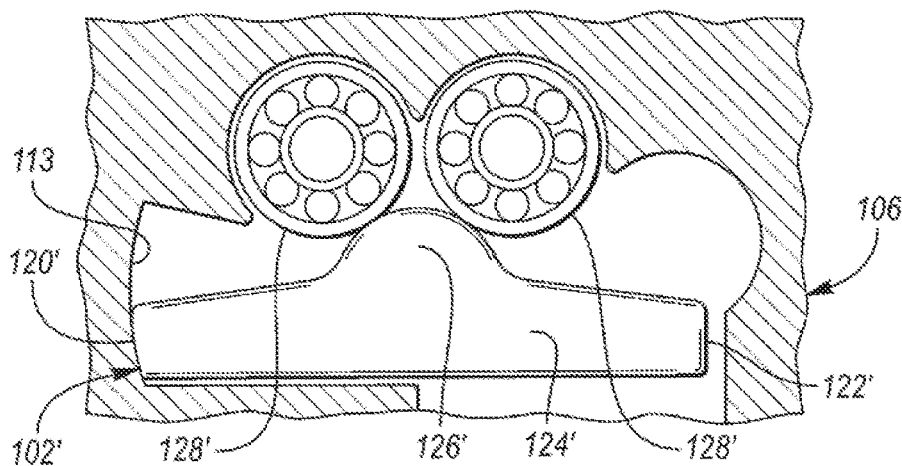
FIG. 7 is a side view, partially broken away and in cross-section, of a pair of roller bearings on opposite sides of a convex, upper pivot of a radial strut.
Figure 8:
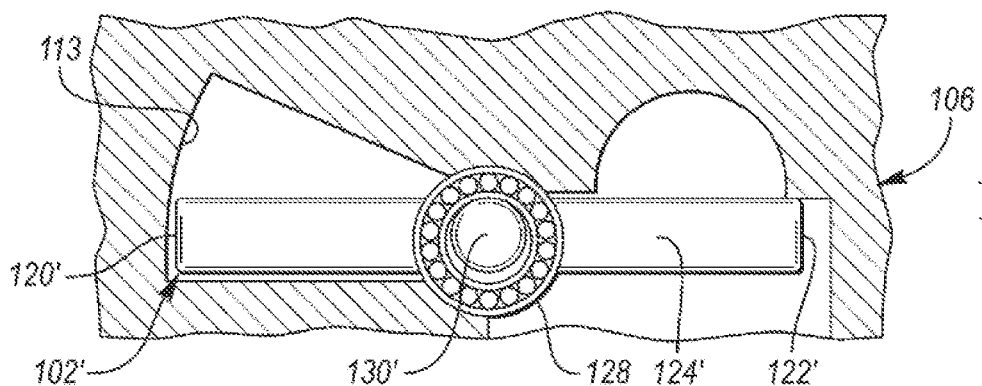
FIG. 8 is a side view, partially broken away and in cross-section, of a roller bearing on an ear of a radial strut.
Figure 9:
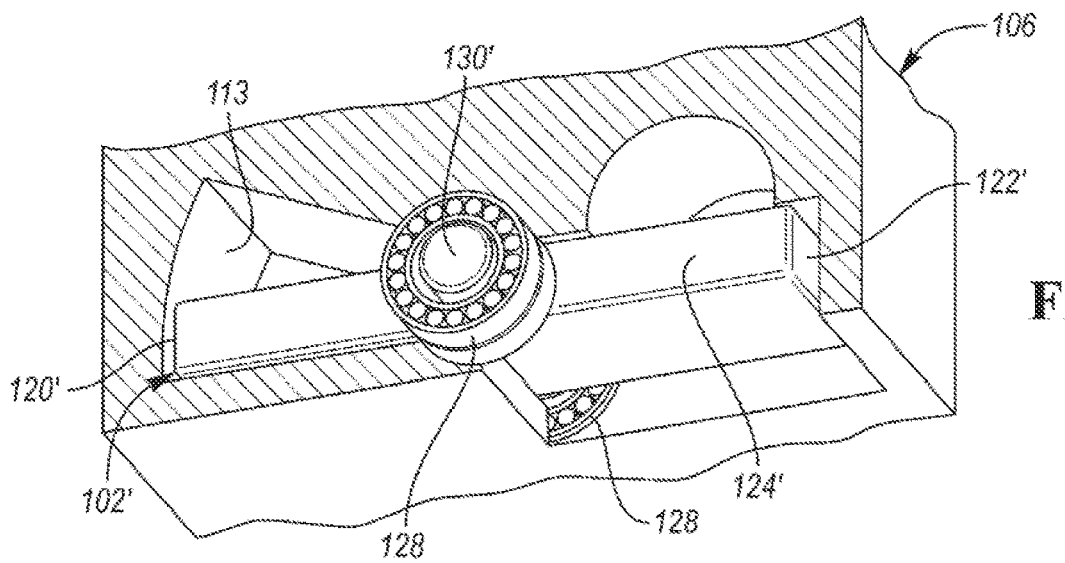
FIG. 9 is a side schematic view, partially broken away and in cross-section, of the radial strut of FIG. 8 but now showing a roller bearing on each ear of the radial strut.
Figure 10:
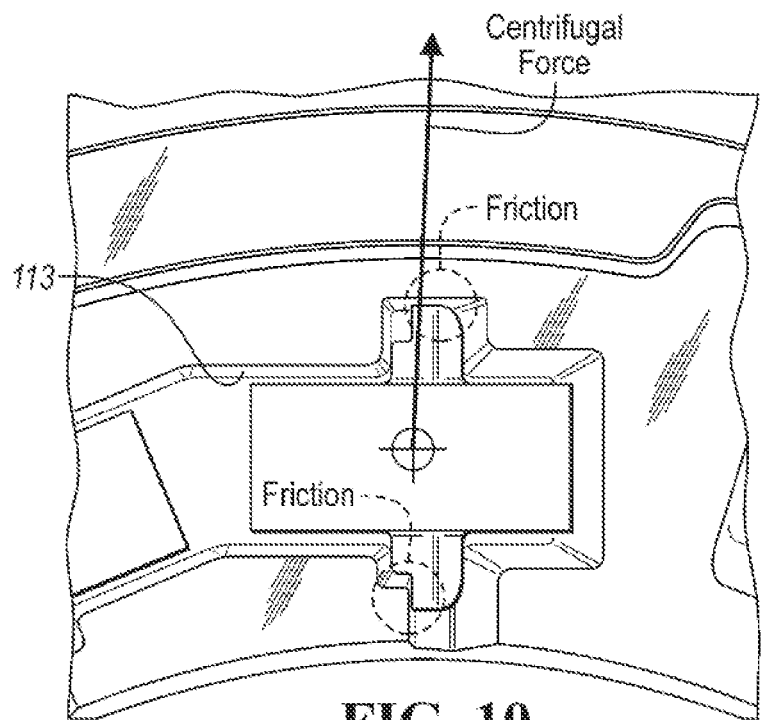
FIG. 10 is a top plan view, partially broken away, of a prior art locking member or strut located within the pocket of a rotating pocket plate wherein dashed circles indicate areas of friction at the walls of the pocket caused by centrifugal force which can approach 200 lbs. at the outer pocket wall.

In the embodiments of FIGS. 7-9, the bearing takes the form of roller bearings 128 and 128'. The strut or locking member is a radial strut 102' having end surfaces 120' and 122' and a main body portion 124'. The radial strut 102' of FIG. 7 includes a convex upper pivot 126' wherein the roller bearings 128' are positioned in bearing contact on opposite sides of the pivot 126'.

The radial strut 102' of FIGS. 8 and 9 includes a pair of ears 130' which extend laterally from the main body portion 124'. Roller bearings 128 are positioned about the ears 130' to rotationally support the radial strut 102'.

The design of the bearings 128' and 128 for the radial strut 102' of FIGS. 7-9 is similar to the design of the bearings 126 for the planar strut 102. The radial strut 102' is sensitive to the center of mass location which will need to be slightly shifted to the disengaged position to prevent an unintentional engagement. There is no stabilizing force with a radial strut which means that the largest force in this system would be the center of mass relative to the pivot point of the strut 102'. Two designs (FIGS. 7-9) could use roller bearings to maintain the centrifugal forces that are created with high rotational speeds. The first design (FIG. 7) would have two bearings 128' on the top of the strut 102' (further to the outside diameter) which would require more radial packaging. The second design (FIGS. 8 and 9) would have a bearing 128 in the middle on each of the "ears" 130' of the strut 102' requiring more axial packaging. The bearings 128 help manage the centrifugal forces, so the largest force in the system would be the moment that is created by the center of mass of the strut 102' not being at the center of rotation. The center of mass of the strut 102' should be biased to the strut-disengaged direction to prevent an unintended actuation. The centrifugal forces can force the rollers within the bearings 128 to be pushed to the outer diameter (OD) of the bearing 128 which could cause some issues. This would have to be taken under consideration when designing this option.

Each of the pockets 113 in the pocket plate 106 provides sufficient clearance to allow sliding movement of its locking member 102 during movement of the locking member 102 between engaged and disengaged positions. Each locking member 102 may be an injection molded locking member such as a metal injection molded locking member or strut.

Figure 5:
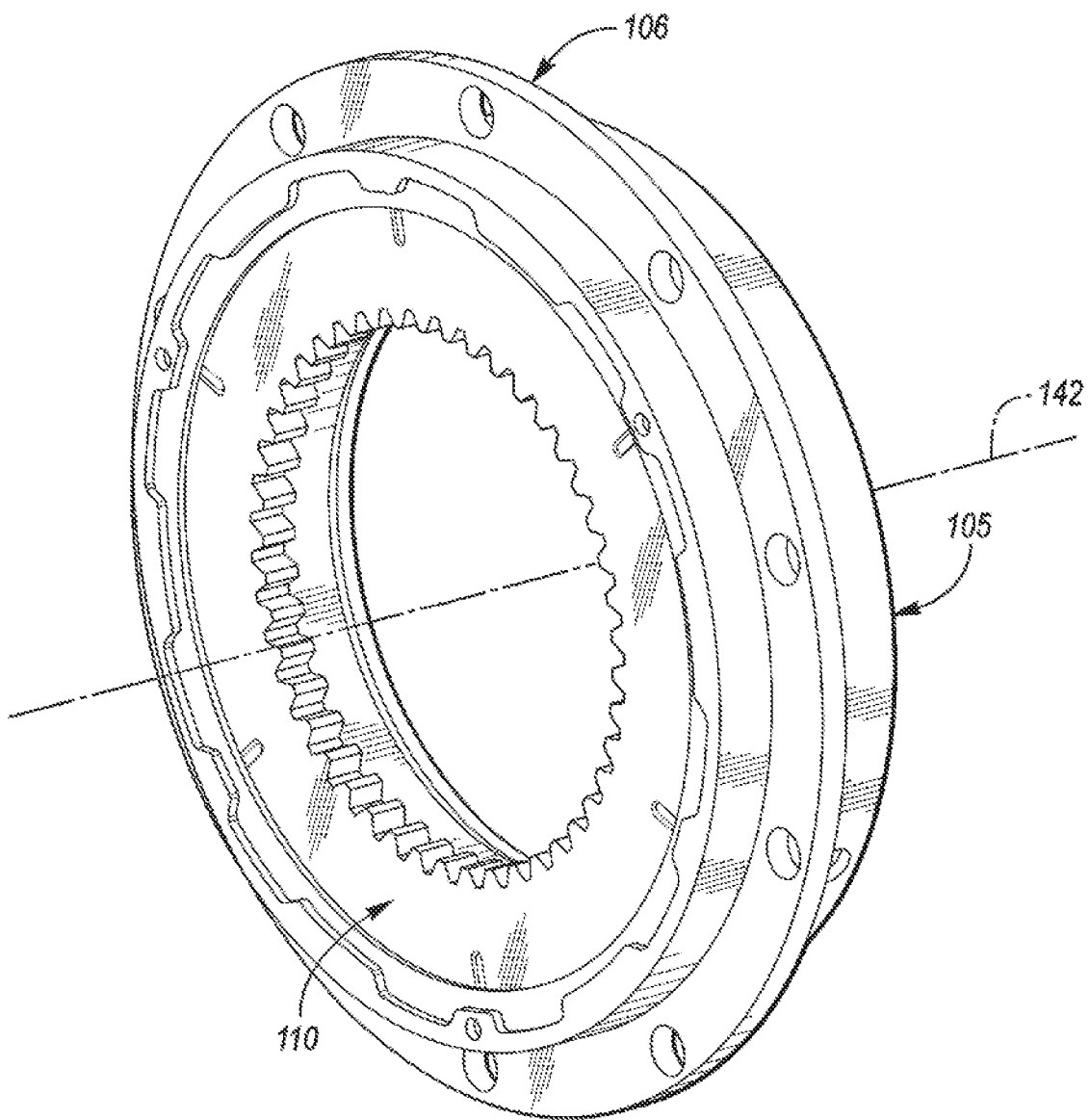
FIG. 5 is an end perspective view of the assembly of FIGS. 3 and 4 in its assembled condition.
Figure 6:
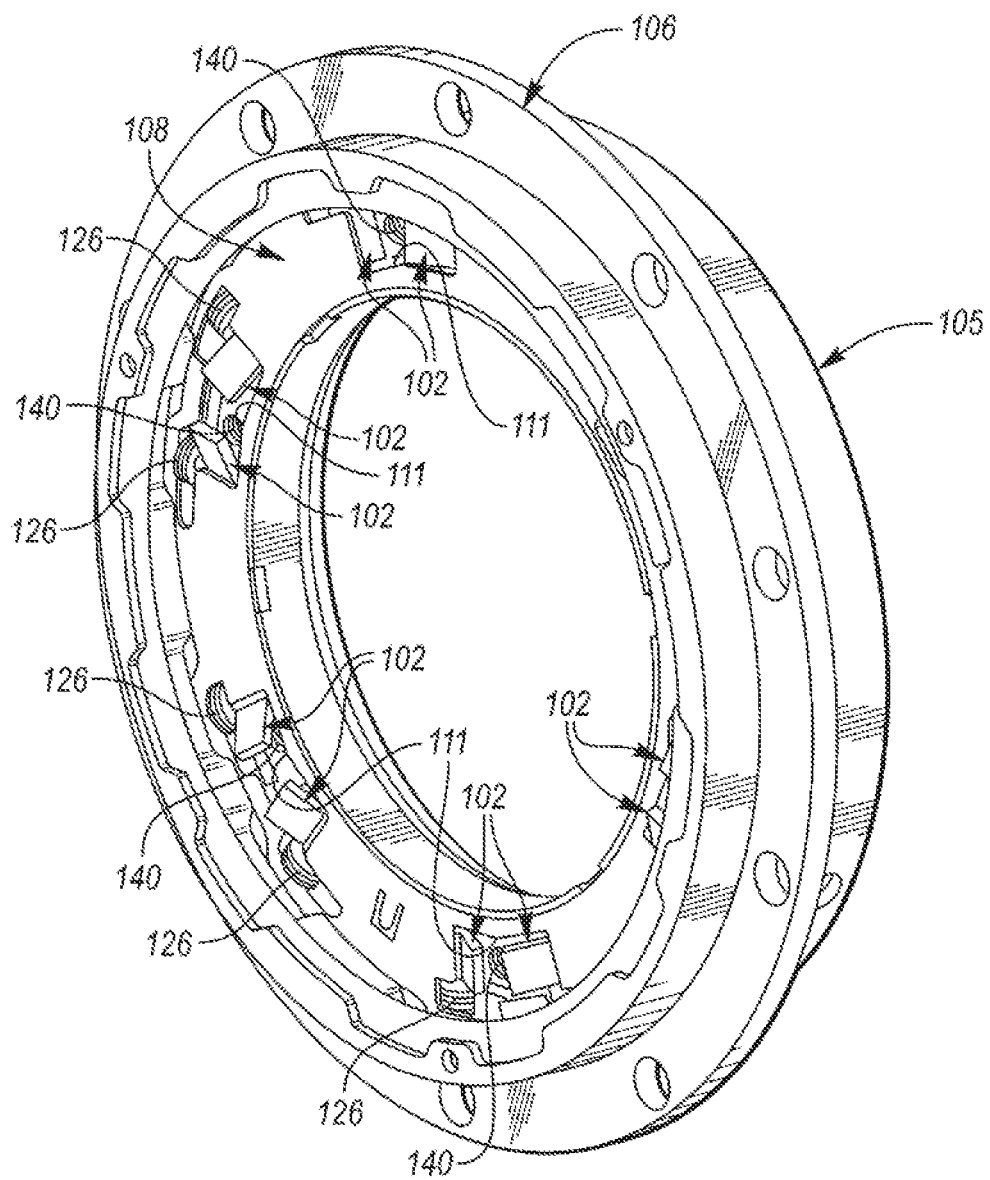
FIG. 6 is a view similar to the view of FIG. 5 but with the notch plate removed to show the locking members and the cover plate.

The first coupling member or pocket plate 106 also has a face with a plurality of passages 140 spaced about the rotational axis 142 (FIG. 5) of the assembly 100 and including a passage 140 in communication with each pocket 113. The passages 140 communicate actuating forces (typically via the apply (or actuating) springs 115) to their respective locking members 102 within their respective pockets 113. The faces of the pocket plate 106 are generally annular and extend generally radially with respect to the rotational axis 142 of the assembly 100. Actuators, such as the spring actuators 115, may be received within the passages 140 to provide the actuating forces to actuate the locking members 102 within their respective pockets 113 so that the locking members 102 move between their engaged and disengaged positions. Other types of actuators besides the spring actuators 115 may be used to provide the actuating forces. Also, pressurized fluid may be used to provide the actuating forces.

Biasing members such as the coiled return springs 114 bias the locking members 102 against pivotal motion of the locking members 102 towards their engaged positions. The spring actuators 115 pivot their locking members 102 against the bias of the return spring biasing members 114. Each pocket 113 may have an inner recess 144 for receiving its respective biasing return spring 114 wherein the pockets 113 are spring pockets.

Figure 21:
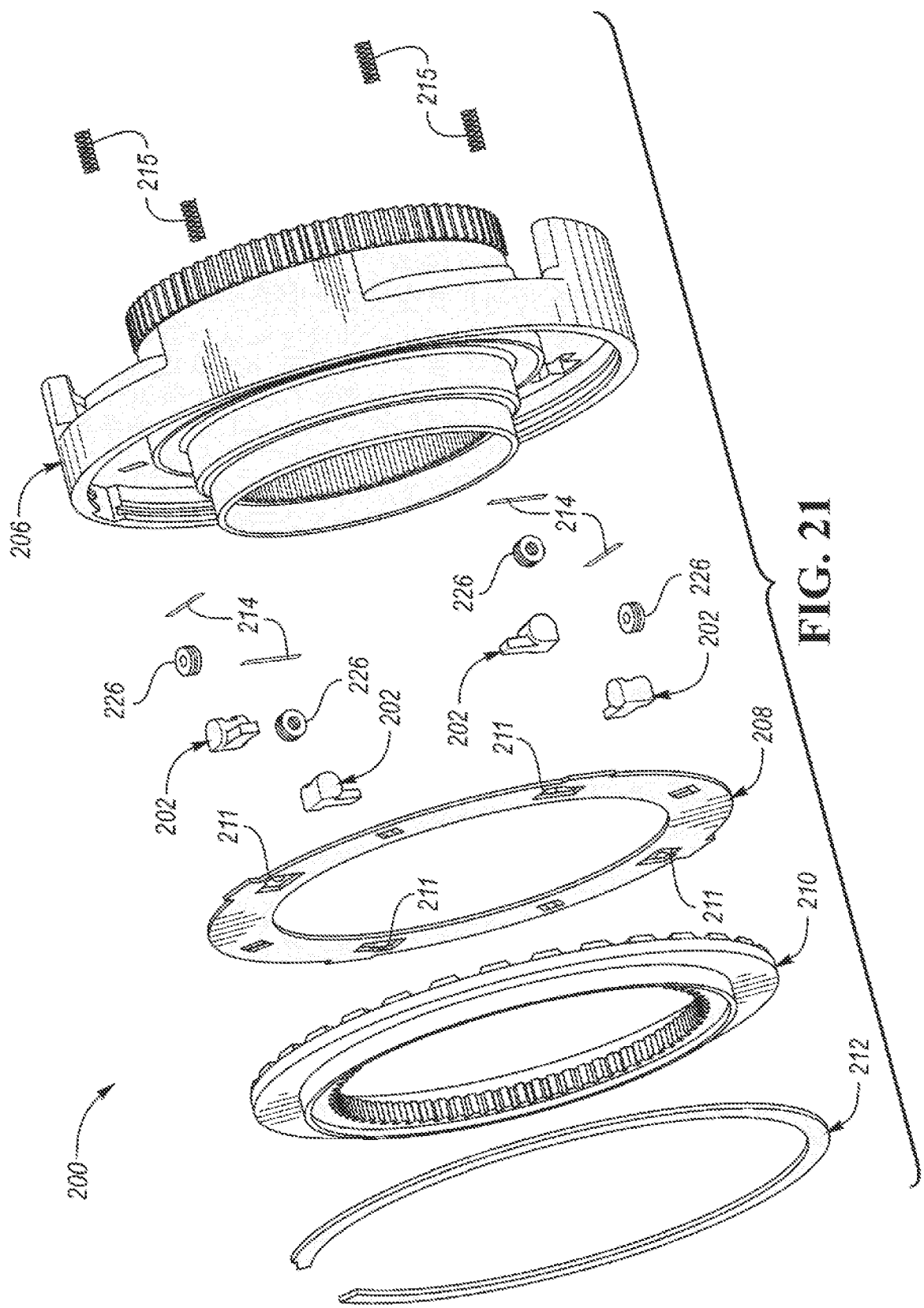
FIG. 21 is an exploded perspective view of an overrunning coupling and control assembly constructed in accordance with an embodiment of the present invention and with the components of FIGS. 16-20.

Referring now to FIGS. 16-21, in accordance with another embodiment, a locking member or strut, generally indicated at 202, is disclosed herein which can be used in its respective coupling and control assembly 200 (FIG. 21). The shape of the strut 202 is optimized to lower the "stabilizing force" that occurs at high rotational speeds.

The active rotating or pivoting strut 202 is actuated to move into its up or coupling position (not shown) so that a lock can occur between a pocket plate 206 and a notch plate 210. This occurs when an actuation system such as the actuation system 104 (FIG. 11) including an apply plate, (not shown), and actuating or apply springs 215 are commanded to move the strut 202. The centrifugal force generated by the rotating strut 202 can hold the strut 202 in the notch plate 210 and prevent disengagement from occurring due to friction. To overcome this disengagement prevention issue, a return spring such as a leaf spring 214 with more force can be used. With at least one embodiment of the invention, the strut 202 can be disengaged with a relatively small return spring. The apply springs 215 are designed to ride on the outside wall of the pockets to reduce the effects of centrifugal force. If this was not designed this way, an apply spring 215 could get caught between the strut and pocket which could cause damage to the apply spring or not allow the apply spring to push the strut into the engaged position.

In at least one embodiment of the invention, at least one rotary bearing in the form of a thrust bearing 226 (i.e., FIGS. 17, 18, and 21) is used for the actively controlled strut 202 with a dynamic clutch where the active strut 202 is actuated to move into its up position so that a lock can occur between the pocket plate 206 and the notch plate 210. When the actuation system is commanded so the strut 202 can disengage itself, the centrifugal force generated by the rotating strut 202 can hold itself in the pocket plate 206 and prevent disengagement from occurring due to the friction. The force to actuate also becomes too large to manage. To overcome this issue, the return spring 214 and the apply spring 215 with more force can be used.

With this embodiment of the invention, the strut 202 can be disengaged with either a small return spring 214, or no return spring depending on how the strut 202 needs to behave at lower speeds, and the force to apply becomes much lower. The thrust bearing 226 is used in between the outer side wall of a pocket 213 in the pocket plate 206 and the strut 202 so that all the force generated by the strut 202 is acted directly onto the bearing 226. This strut 202 is in the planer direction so that the center of mass of the strut 202 does not affect the function of engaging or disengaging. The insensitivity of the center of mass of the strut 202 is due to the orientation of the planer configuration which is important since a strut in the radial direction (i.e., FIGS. 7-9) will always have the center of mass affecting the engagement and disengagement forces. The bearing 126 is used to minimize the friction that resists the strut's pivoting motion. Without the bearing, the friction interface is characterized by the coefficient of friction for lubricated steel on steel (approximately 0.2). With the bearing, the friction interface is characterized by the coefficient of rolling friction for a steel rolling ball in a steel race (approximately 0.0015). This reduces the frictional load on the strut dramatically (approximately 98.2% reduction).

The assembly 200 includes the backing or apply plate (not shown), the pocket plate 206, a cover or retainer plate, generally indicated at 208, the notch plate 210, and a snap ring, generally indicated at 212, which holds all of the plates 206, 208 and 210 together. The biasing members or apply springs 215 bias their respective struts 202 within their respective pockets 213. The leaf or biasing spring 214 is located in a groove 203 formed in a lower surface of the strut 202.

As in the embodiment shown in FIGS. 3 and 4, the apply plate supports dowels (not shown) and the pocket plate 206 supports bushings (not shown) in holes in which the dowels are supported by the bushings. In this way, the plates are connected. The retainer plate 208 has a plurality of passages 211 through which the struts 202 can extend so that the struts 202 can perform their locking function.

Each strut 202 includes a member-engaging first end surface 220, a member-engaging second end surface 222 and a lobed main body portion 224 between the end surfaces 220 and 222. At least one and preferably two (so that each strut 202 can be used as either a forward or a reverse strut) projecting lobes or ears 230 extends laterally from the main body portion 224. The ears 230 have substantially flat parallel ends, one of which engages an inner end surface 225 of the thrust bearing 226. The end surfaces 222 and 220 of the locking member 202 are moveable between an engaged position (or coupling position or up position) and a disengaged position (or uncoupling position or down position) with respect to the coupling members 206 and 210 during pivotal motion whereby one-way torque transfer may occur between the coupling members 206 and 210.

The biggest force that exists in this design is a stabilizing force that wants to keep the strut 202 in the down position caused by high rotational speeds. This force gets bigger as speed in the clutch increases. This force does not exist in the radial style strut of FIGS. 7-9.

Each of the pockets 213 in the pocket plate 206 provides sufficient clearance to allow sliding movement of its locking member 202 during movement of the locking member 202 between engaged and disengaged positions. Each locking member 202 may be an injection molded locking member such as a metal injection molded locking member or strut.

The first coupling member or pocket plate 206 also has a face with a plurality of passages 240 spaced about the rotational axis of the assembly 200 and including a passage 240 in communication with each pocket 213. The passages 240 communicate actuating forces (typically via the actuating springs 215) to their respective locking members 202 within their respective pockets 213. The faces of the pocket plate 206 are generally annular and extend generally radially with respect to the rotational axis of the assembly 200. Actuators, such as the spring actuators 215, may be received within the passages 240 to provide the actuating forces to actuate the locking members 202 within their respective pockets 213 so that the locking members 202 move between their engaged and disengaged positions. Other types of actuators besides the spring actuators 215 may be used to provide the actuating forces. Also, pressurized fluid may be used to provide the actuating forces.

Biasing members such as the leaf springs 214 bias the locking members 202 against pivotal motion of the locking members 202 towards their engaged positions. The spring actuators 215 pivot their locking members 202 against the bias of the return spring biasing members 214. Each pocket 213 may have an inner recess 244 for receiving its respective biasing leaf spring 214 wherein the pockets 213 are spring pockets.

Figure 27:
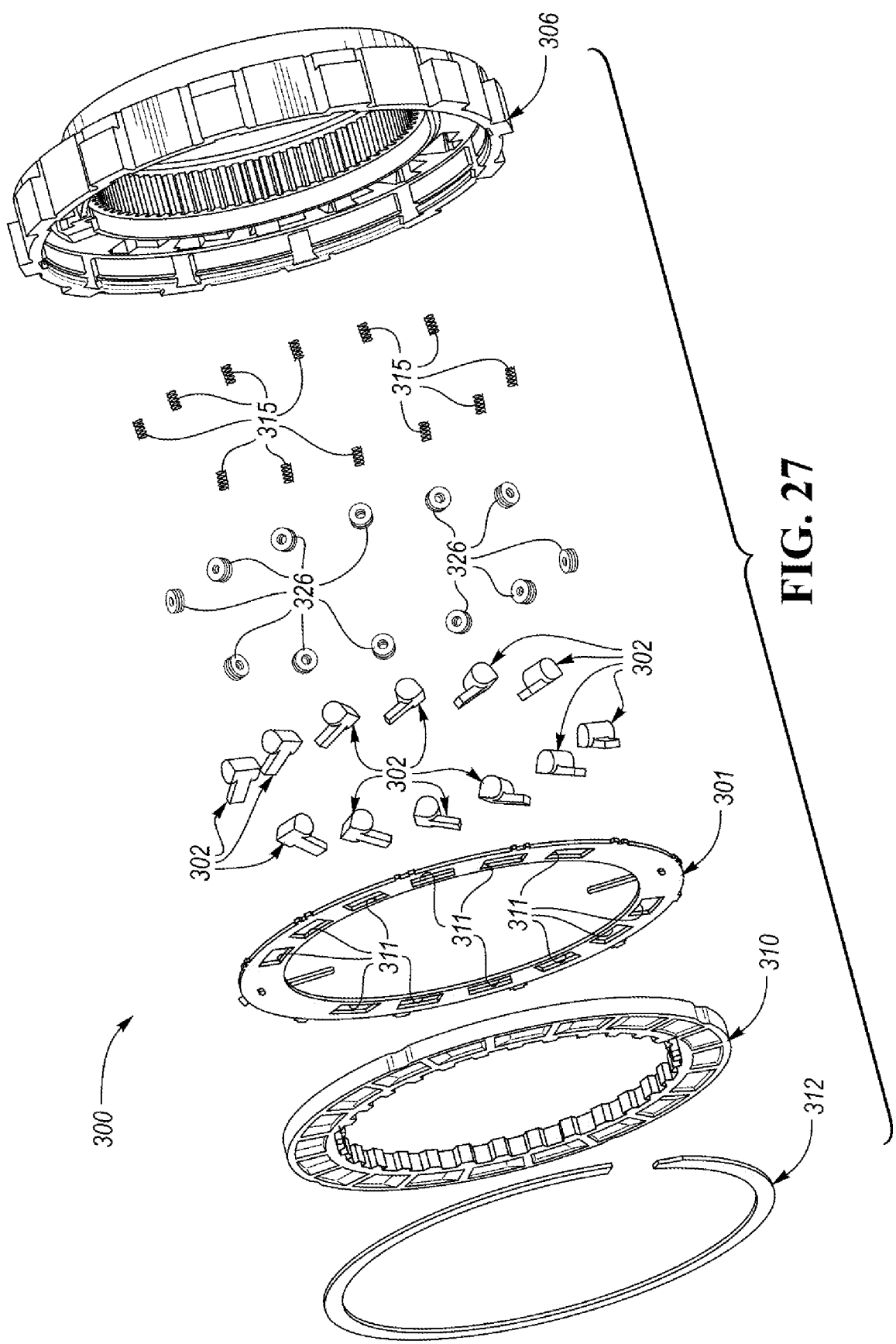
FIG. 27 is an exploded perspective view of an overrunning coupling and control assembly constructed in accordance with another embodiment of the present invention with the components of FIGS. 22-26.

Referring now to FIGS. 22-27, a lobed locking member or strut, generally indicated at 302, is disclosed herein which can be used in its respective coupling and control assembly 300 (FIG. 27). The strut 302 is similar in size and shape to the strut 202. The assembly 300 includes a selector plate, generally indicated at 301, including apertures 311 which allow the struts 302 to rise or pivot into notches of a notch plate 310. Alternatively, a fixed cover plate can be used for a passive one-way clutch function.

Figure 22:
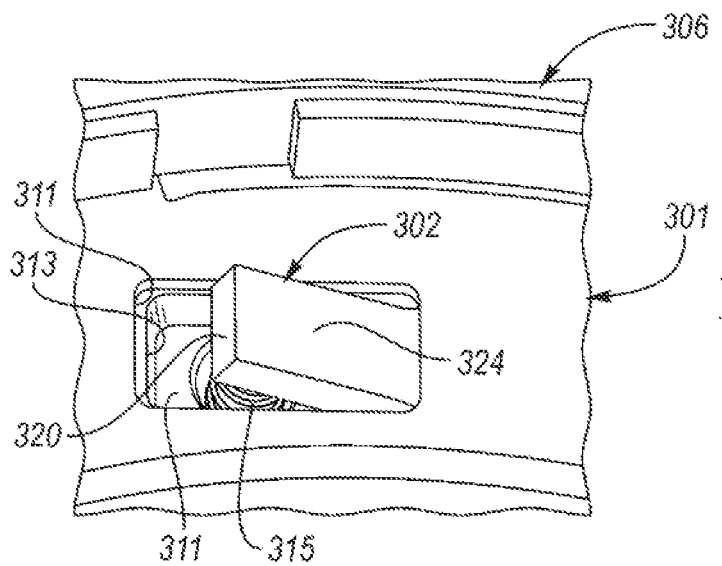
FIG. 22 is a top perspective view, partially broken away, of a locking member similar to the locking member of FIGS. 16, 17 and 20 within a pocket of a pocket plate together with a rotary selector plate which allows the locking member to rise into a notch of a notch plate.
Figure 23:
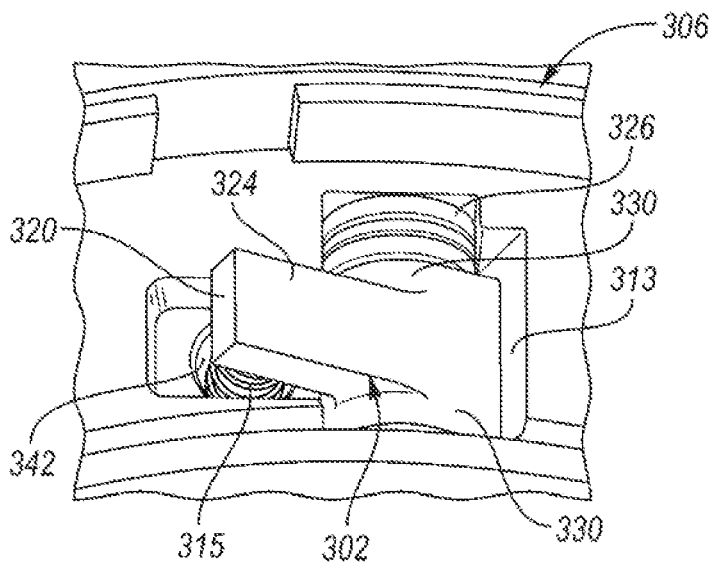
FIG. 23 is a view similar to the view of FIG. 22 but with the selector plate removed to reveal a spring and a thrust bearing for the locking member.
Figure 24:
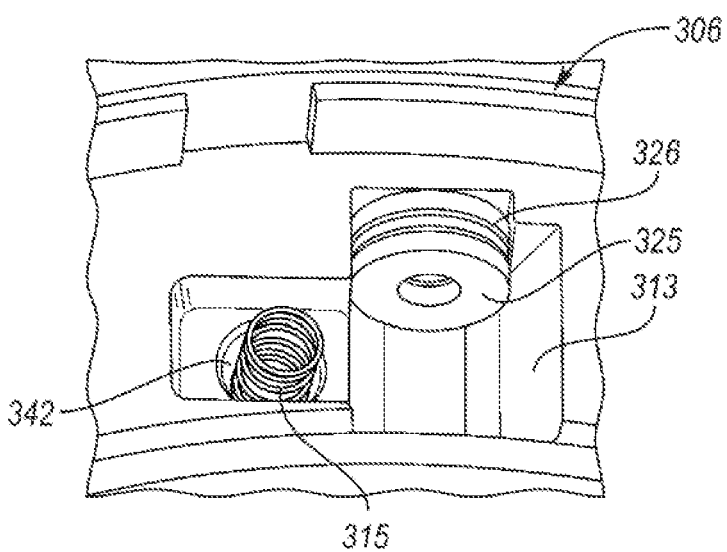
FIG. 24 is a view similar to the views of FIGS. 22 and 23 but with the locking member and the selector plate removed to particularly show the spring and the thrust bearing for the locking member.
Figure 25:
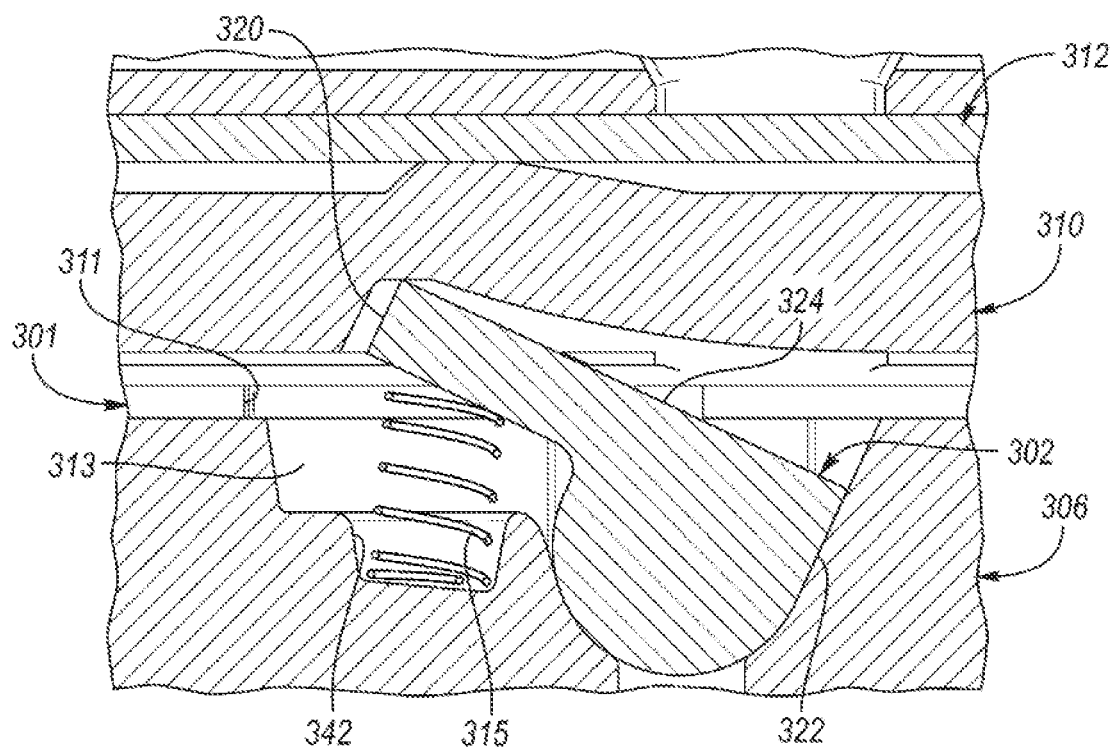
FIG. 25 is a view similar to the view of FIG. 19 with the locking member and spring of FIGS. 22 and 23 and the selector plate of FIG. 22 and with the locking member in its extended, coupling position.
Figure 26:
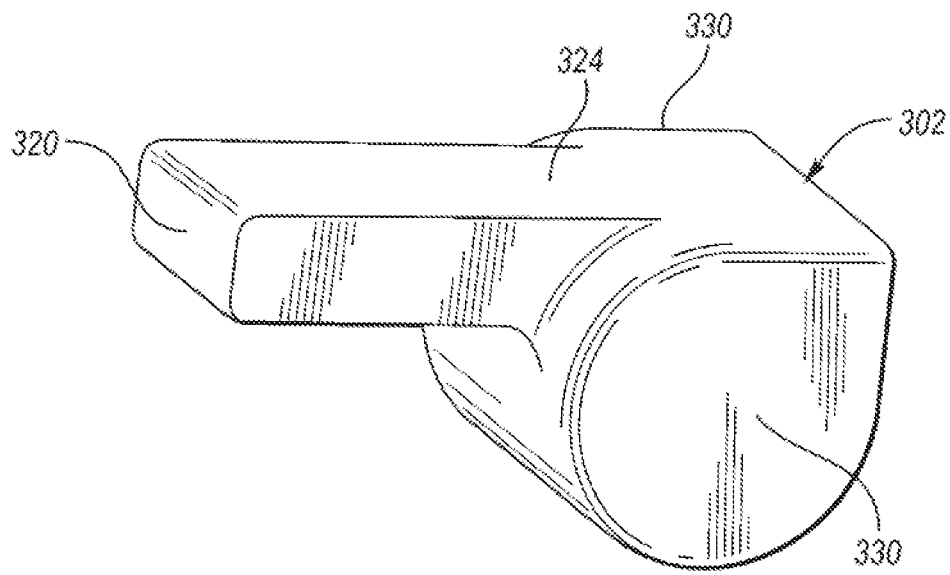
FIG. 26 is a side perspective view of the locking member or strut of FIGS. 22, 23 and 25.

The active rotating or pivoting strut 302 is actuated to move into its up or coupling position (FIGS. 22, 23 and 25) so that a lock can occur between a pocket plate 306 and the notch plate 310. This occurs when the selector plate 301 is commanded to rotate in a first direction so that the strut 302 can extend through an aperture 311 in the selector plate 301 as shown in FIGS. 22 and 25. The centrifugal force generated by the rotating strut 302 can hold the strut 302 in the notch plate 310 and prevent disengagement from occurring. With at least one embodiment of the invention, the strut 302 can be disengaged by again rotating the selector plate 301 but in the opposite direction.

In at least one embodiment of the invention, at least one rotary bearing in the form of a thrust bearing 326 (i.e., FIGS. 23 and 24) is used for the strut 302 where the strut 302 is actuated to move into its up position so that a lock can occur between the pocket plate 306 and notch plate 310. When the selector plate 301 is commanded to rotate so the strut 302 can disengage, the centrifugal force generated by the rotating strut 302 can hold itself in the pocket plate 306 and prevent disengagement from occurring due to the friction. The force to actuate may become too large to manage. To overcome this issue, the apply spring 315 with more force can be used.

With this embodiment of the invention, the strut 302 can be disengaged from the outer side wall of the pocket with the thrust bearing 326 used in between the outer side wall of a pocket in the pocket plate 306 and the strut 302 so that all the force generated by the strut 302 is reacted directly into the bearing 326. As in the embodiment of FIGS. 16-21, the thrust bearing 326 reacts the centrifugal forces generated from the strut 302 at high speeds. The strut 302 is in the planer direction which means the center of mass of the strut 302 does not affect the function of engaging or disengaging. The insensitivity of the center of mass of the strut 302 is due to the orientation of the planer configuration which is important since a strut in the radial direction (i.e., FIGS. 7-9) will always have the center of mass affecting the engagement and disengagement forces. The bearing 126 is used to minimize the friction that resists the strut's pivoting motion.

Without the bearing, the friction interface is characterized by the coefficient of friction for lubricated steel on steel (approximately 0.2). With the bearing, the friction interface is characterized by the coefficient of rolling friction for a steel rolling ball in a steel race (approximately 0.0015). This reduces the frictional load on the strut dramatically (approximately 98.2% reduction).

The assembly 300 includes the pocket plate 306, the selector plate 301 (or possibly a cover or retainer plate), the notch plate 310, and a snap ring, generally indicated at 312, which holds all of the plates 301, 306, and 310 together. The biasing members or apply springs 315 bias their respective struts 302 within their respective pockets 313.

Each strut 302 includes a member-engaging first end surface 320, a member-engaging second end surface 322 and an elongated main body portion 324 between the end surfaces 320 and 322. At least one and preferably two (so that each strut 302 can be used as either a forward or a reverse strut) projecting lobes or ears 330 extends laterally from the main body portion 324. The ears 330 have substantially flat parallel ends, one of which engages an inner end surface 325 of the thrust bearing 326. The end surfaces 322 and 320 of the locking member 302 are moveable between engaged and disengaged positions with respect to the coupling members 306 and 310 during pivotal motion whereby one-way torque transfer may occur between the coupling members 306 and 310.

The biggest force that exists in this design is a stabilizing force that wants to keep the strut 302 in the down position caused by high rotational speeds. This force gets bigger as speed in the clutch increases. This force does not exist in the radial style strut of FIGS. 7-9 as previously mentioned.

Each of the pockets 313 in the pocket plate 306 provides sufficient clearance to allow sliding movement of its locking member 302 during movement of the locking member 302 between engaged and disengaged positions. Each locking member 302 may be an injection molded locking member such as a metal injection molded locking member or strut.

The first coupling member or pocket plate 306 includes an aperture 342 in communication with each pocket 313. Biasing members, such as coiled apply springs 315, may be received within the apertures 342 to provide the biasing forces to bias the locking members 302 within their respective pockets 313 so that the locking members 302 move between their engaged and disengaged positions. Other types of biasing members besides the apply springs 315 may be used to provide the biasing forces.

The non-apertured portions of the selector plate 301 prevent pivotal motion of the locking members 302 towards their engaged positions. The apply springs 315 pivot their locking members 302 when the apertures 311 are aligned with the locking members 302.

Figure 28:
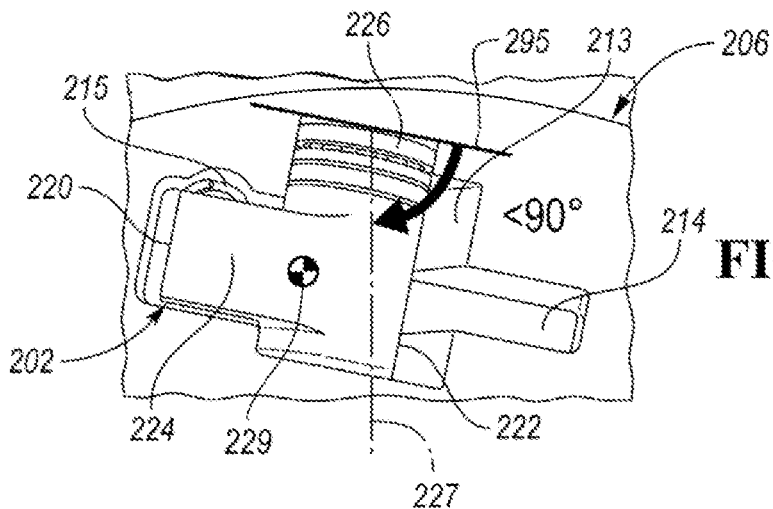
FIG. 28 is a view similar to the view of FIG. 17 but with the pocket of the pocket plate rotated outwardly.
Figure 29:
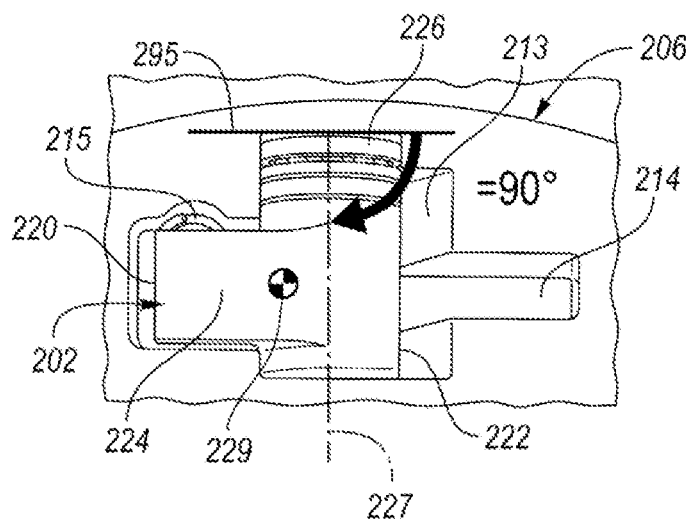
FIG. 29 is a view similar to the views of FIGS. 17 and 28 but with no pocket rotation.
Figure 30:
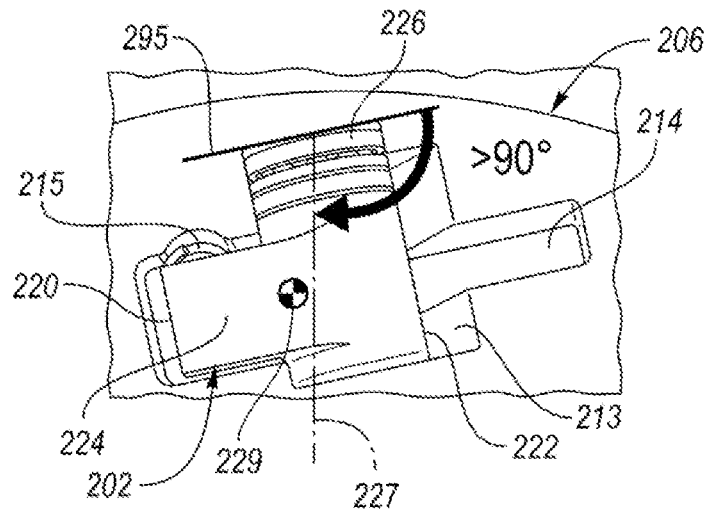
FIG. 30 is a view similar to the views of FIGS. 17, 28 and 29 but with inward pocket rotation.

Referring now to FIGS. 28, 29, and 30 (which correspond to FIG. 17) besides the many previously described factors effecting the "laydown" or "lockdown" speed of a strut, the inventors of this application have discovered that "pocket rotation" (i.e., the angle of the pocket outer wall 295 relative to a line (or centerline) 227 running through the center of the clutch) is another factor that affects the amount of actuation force needed to rotate the strut 202. Counter-clockwise (i.e., outward) pocket rotation as shown in FIG. 28 lowers actuation force for a rotating pocket plate thereby allowing or compensating for relatively large draft angles which lowers manufacturing costs. Clockwise (i.e., inward) pocket rotation as shown in FIG. 30 raises laydown speed. The desired speed (i.e., RPM) at which struts laydown determines the clutch's ability to engage. Therefore, if it is desired that the clutch engages at a relatively high speed (i.e., RPM), then inward pocket rotation would be used.

As described in U.S. publication application 2017/0343060 assigned to the same assignee as the assignee of the present application, with the addition of a pocket rotation, the geometric composition of the strut and its pocket change, resulting in the generation of a new moment due to the centrifugal force now acting on the strut. Centrifugal force is the physical force causing the strut/lock wall dynamics as described herein. This new moment arises from the relative change of point of rotation about which the strut rises or descends.

The largest force acting on the strut 202 while at high rotational speeds is the Euler torque (also known as the stabilizing torque). If the strut 202 is rotated inwards (i.e. FIG. 30), the moment due to the center 229 of the mass of the strut 202 when the strut 202 is pitched in the engaged position cancels out the Euler torque. The bearing 226 removes the friction, and the inward rotation cancels the Euler torque. This allows the strut 202 to pitch in and out of the notch plate 210 at high rotational speeds with small amount of actuation force. This can be applied to all of the different struts disclosed herein whether actively applied or passively applied.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engageable coupling assembly comprising:
   first and second coupling members, the first coupling member supported for rotation about a rotational axis, the first coupling member including a coupling face having a pocket;
   a locking member received in the pocket, the locking member including a member-engaging first end surface, a member-engaging second end surface, and a main body portion between the end surfaces, the locking member being pivotable between an engaged position in which the locking member couples the coupling members together whereby torque transfer may occur between the coupling members in a first direction about the rotational axis and a disengaged position in which the first coupling member may rotate relative to the second coupling member in the first direction about the rotational axis;
   wherein the pocket is partially defined by an outer wall;
   a bearing positioned between a part of the main body portion and the outer wall of the pocket so that the part of the main body portion contacts the bearing to reduce friction during the pivotal motion of the locking member; and
   wherein the bearing comprises a thrust bearing which reacts centrifugal forces generated from the locking member when the first coupling member rotates in the first direction about the rotational axis at a rotational speed above a threshold.

2. The assembly as claimed in claim 1, wherein the part of the main body portion is a generally cylindrical end portion for contacting the bearing.

3. The assembly as claimed in claim 1, wherein the part of the main body portion comprises a projecting ear which extends laterally from a remainder of the main body portion.

4. The assembly as claimed in claim 1, wherein the locking member is a planar or radial locking strut.

5. The assembly as claimed in claim 4, wherein the locking strut is an active locking strut.

6. The assembly as claimed in claim 1, wherein the locking member is a metal injection molded locking member.

7. The assembly as claimed in claim 1, wherein the locking member includes inner and outer pivots which extend laterally from the main body portion for enabling pivotal motion of the locking member about an axis which intersects the pivots.

8. The assembly as claimed in claim 1, wherein the pocket is angled with respect to a normal of a centerline through the rotational axis to improve locking member dynamics.

9. The assembly as claimed in claim 1, wherein the part of the main body portion projects from a remainder of the main body portion.

10. An overrunning coupling and control assembly comprising:
    first and second coupling members, the first coupling member supported for rotation about a rotational axis, the first coupling member including a first coupling face having a pocket;
    a locking member received in the pocket, the locking member including a member-engaging first end surface, a member-engaging second end surface, and a main body portion between the end surfaces, the locking member being movable between an engaged position in which the locking member couples the coupling members together whereby torque transfer may occur between the coupling members in a first direction about the rotational axis and a disengaged position in which the first coupling member may rotate relative to the second coupling member in the first direction about the rotational axis;
    the first coupling member further including a second face spaced from the first coupling face and having a passage in communication with the pocket to communicate an actuating force to the locking member to actuate the locking member within the pocket so that the locking member moves between the engaged and disengaged positions;
    wherein the pocket is partially defined by an outer wall;
    a bearing positioned between a part of the main body portion and the outer wall of the pocket so that the part of the main body portion contacts the bearing to reduce friction during movement of the locking member between the engaged and disengaged positions; and
    wherein the bearing comprises a thrust bearing which reacts centrifugal forces generated from the locking member when the first coupling member rotates in the first direction about the rotational axis at a rotational speed above a threshold.

11. The assembly as claimed in claim 10, wherein the part of the main body portion has a generally cylindrical end portion for contacting the bearing.

12. The assembly as claimed in claim 10, wherein the part of the main body portion comprises a projecting ear which extends laterally from a remainder of the main body portion.

13. The assembly as claimed in claim 10, wherein the locking member is a planar or radial locking strut.

14. The assembly as claimed in claim 13, wherein the locking strut is an active locking strut.

15. The assembly as claimed in claim 10, wherein the locking member is a metal injection molded locking member.

16. The assembly as claimed in claim 10, wherein the locking member includes inner and outer pivots which extend laterally from the main body portion for enabling pivotal motion of the locking member about an axis which intersects the pivots.

17. The assembly as claimed in claim 10, wherein the pocket is angled with respect to a normal of the centerline to improve locking member dynamics.

18. The assembly as claimed in claim 10, wherein the part of the main body portion projects from a remainder of the main body portion.

* * * * *